(12) United States Patent
Beers

(10) Patent No.: US 11,550,815 B2
(45) Date of Patent: Jan. 10, 2023

(54) PROVIDING AND SURFACING METRICS FOR VISUALIZATIONS

(71) Applicant: Tableau Software, LLC, Seattle, WA (US)

(72) Inventor: Andrew C. Beers, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 97 days.

(21) Appl. No.: 16/944,085

(22) Filed: Jul. 30, 2020

(65) Prior Publication Data

US 2022/0035831 A1 Feb. 3, 2022

(51) Int. Cl.
| G06F 7/00 | (2006.01) |
| G06F 16/26 | (2019.01) |
| G06N 20/00 | (2019.01) |
| G06N 5/04 | (2006.01) |

(52) U.S. Cl.
CPC .............. *G06F 16/26* (2019.01); *G06N 5/04* (2013.01); *G06N 20/00* (2019.01)

(58) Field of Classification Search
CPC .. G06F 16/26; G06F 16/24578; G06F 16/221; G06F 16/248; G06F 16/904; G06N 20/00; G06N 5/04; H04L 43/067; H04L 43/0817; H04L 43/0852; H04L 43/0811; H04L 43/16
See application file for complete search history.

(56) References Cited

U.S. PATENT DOCUMENTS

| 7,010,364 | B1 | 3/2006 | Singh et al. |
| 8,099,674 | B2 | 1/2012 | Mackinlay et al. |
| 8,589,811 | B2 | 11/2013 | Gotz |
| 8,983,994 | B2 | 3/2015 | Neels et al. |

(Continued)

FOREIGN PATENT DOCUMENTS

| JP | 2007249354 A | 9/2007 |
| JP | 2008217480 A | 9/2008 |

(Continued)

OTHER PUBLICATIONS

Office Communication for U.S. Appl. No. 16/732,027 dated Jun. 14, 2021, pp. 1-22.

(Continued)

*Primary Examiner* — Mohammad A Sana
(74) *Attorney, Agent, or Firm* — John W. Branch; Branch Partners PLLC

(57) ABSTRACT

Embodiments are directed to generating metrics based on visualizations. A dashboard that may be associated with source visualizations display a current value of metrics from source visualization models. A classifier may automatically use characteristics from the source visualizations to determine metrics for the source visualization. The source visualization models may be sample to provide values of the metrics across time, at a sampling rate determined by a metric profile. The sampled values may be stored with time values in a metric data store such that the time values may correspond to when the values sampled from the visualization. Metric visualizations may be generated based on the values and the time values such that the metric visualizations display previously sampled values of the metrics.

24 Claims, 12 Drawing Sheets

(56) References Cited

U.S. PATENT DOCUMENTS

| | | |
|---|---|---|
| 9,335,911 B1 | 5/2016 | Elliot et al. |
| 9,361,320 B1 | 6/2016 | Vijendra et al. |
| 9,418,105 B2 | 8/2016 | Buchheit et al. |
| 9,613,086 B1 | 4/2017 | Sherman |
| 9,779,147 B1 | 10/2017 | Sherman et al. |
| 10,552,513 B1 | 2/2020 | Harkare |
| 10,572,544 B1 | 2/2020 | Zhang et al. |
| 10,572,804 B1 | 2/2020 | Hilley |
| 10,572,859 B1 | 2/2020 | Evans et al. |
| 10,572,925 B1 | 2/2020 | Roy Chowdhury et al. |
| 10,592,525 B1 | 3/2020 | Khante et al. |
| 10,642,723 B1 | 5/2020 | Krishnamoorthy |
| 10,705,695 B1 | 7/2020 | Porath et al. |
| 10,719,332 B1 | 7/2020 | Dwivedi et al. |
| 10,775,976 B1 | 9/2020 | Abdul-Jawad et al. |
| 10,929,415 B1 | 2/2021 | Shcherbakov et al. |
| 10,963,347 B1 | 3/2021 | Chen et al. |
| 11,232,506 B1 | 1/2022 | Zielnicki |
| 2005/0134589 A1 | 6/2005 | Heer et al. |
| 2008/0168135 A1 | 7/2008 | Redlich et al. |
| 2011/0137850 A1 | 6/2011 | Mourey et al. |
| 2011/0296309 A1 | 12/2011 | Ngan |
| 2011/0302110 A1 | 12/2011 | Beers et al. |
| 2012/0229466 A1 | 9/2012 | Riche et al. |
| 2012/0233182 A1 | 9/2012 | Baudel et al. |
| 2013/0091465 A1 | 4/2013 | Kikin-Gil et al. |
| 2013/0103677 A1* | 4/2013 | Chakra .................. G06F 16/248 707/723 |
| 2013/0204894 A1 | 8/2013 | Faith et al. |
| 2014/0019443 A1 | 1/2014 | Golshan |
| 2014/0032548 A1 | 1/2014 | Gilra et al. |
| 2014/0059017 A1 | 2/2014 | Chaney et al. |
| 2014/0074889 A1 | 3/2014 | Neels et al. |
| 2014/0344008 A1 | 11/2014 | Gammage et al. |
| 2015/0278214 A1 | 10/2015 | Anand et al. |
| 2016/0034305 A1 | 2/2016 | Shear et al. |
| 2016/0092408 A1 | 3/2016 | Lagerblad et al. |
| 2016/0103908 A1 | 4/2016 | Fletcher et al. |
| 2016/0196534 A1 | 7/2016 | Jarrett et al. |
| 2016/0307210 A1 | 10/2016 | Agarwal et al. |
| 2016/0307233 A1 | 10/2016 | Pan et al. |
| 2016/0350950 A1 | 12/2016 | Ritchie et al. |
| 2016/0357829 A1 | 12/2016 | Fung et al. |
| 2016/0364770 A1 | 12/2016 | Denton et al. |
| 2017/0061659 A1 | 3/2017 | Puri et al. |
| 2017/0069118 A1 | 3/2017 | Stewart |
| 2017/0124617 A1 | 5/2017 | Spoelstra et al. |
| 2017/0132489 A1 | 5/2017 | Simgi |
| 2017/0140118 A1 | 5/2017 | Haddad et al. |
| 2017/0154088 A1 | 6/2017 | Sherman |
| 2017/0154089 A1 | 6/2017 | Sherman |
| 2017/0220633 A1 | 8/2017 | Porath et al. |
| 2017/0308913 A1 | 10/2017 | Chao et al. |
| 2018/0004363 A1 | 1/2018 | Tompkins |
| 2018/0039399 A1 | 2/2018 | Kaltegaertner et al. |
| 2018/0121035 A1 | 5/2018 | Filippi et al. |
| 2018/0129369 A1 | 5/2018 | Kim et al. |
| 2018/0232405 A1 | 8/2018 | Samara et al. |
| 2018/0267676 A1 | 9/2018 | Glueck et al. |
| 2018/0343321 A1 | 11/2018 | Chang |
| 2019/0012553 A1 | 1/2019 | Maruchi et al. |
| 2019/0026681 A1 | 1/2019 | Polli et al. |
| 2019/0043506 A1 | 2/2019 | Rivkin et al. |
| 2019/0102425 A1 | 4/2019 | Obeidat |
| 2019/0108272 A1 | 4/2019 | Talbot et al. |
| 2019/0129964 A1 | 5/2019 | Corbin, II et al. |
| 2019/0130512 A1 | 5/2019 | Kuhn |
| 2019/0179621 A1 | 6/2019 | Salgado et al. |
| 2019/0188333 A1 | 6/2019 | Williams et al. |
| 2019/0213608 A1 | 7/2019 | Ouyang et al. |
| 2019/0355447 A1 | 11/2019 | Barkol et al. |
| 2020/0012939 A1 | 1/2020 | Hu et al. |
| 2020/0019546 A1 | 1/2020 | Luo et al. |
| 2020/0050636 A1 | 2/2020 | Datla et al. |
| 2020/0066397 A1 | 2/2020 | Rai et al. |
| 2020/0104731 A1 | 4/2020 | Oliner et al. |
| 2020/0233559 A1 | 7/2020 | Rueter et al. |
| 2020/0250562 A1 | 8/2020 | Bly |
| 2020/0311680 A1 | 10/2020 | Wahl et al. |
| 2020/0320462 A1 | 10/2020 | Wang et al. |
| 2020/0372472 A1 | 11/2020 | Kenthapadi et al. |
| 2020/0403944 A1 | 12/2020 | Joshi et al. |
| 2021/0011961 A1 | 1/2021 | Guan et al. |
| 2021/0019338 A1* | 1/2021 | Grampurohit ........ G06F 3/0481 |
| 2021/0049143 A1 | 2/2021 | Jacinto et al. |
| 2021/0088418 A1 | 3/2021 | Sato et al. |
| 2021/0110288 A1 | 4/2021 | Poothiyot et al. |
| 2021/0194783 A1* | 6/2021 | Sinha ..................... G06F 16/26 |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Office Communication for U.S. Appl. No. 16/915,963 dated Jul. 19, 2021, pp. 1-9.

Office Communication for U.S. Appl. No. 16/903,967 dated Sep. 27, 2021, pp. 1-16.

Office Communication for U.S. Appl. No. 17/014,882 dated Nov. 2, 2021, pp. 1-33.

International Search Report and Written Opinion for International Patent Application No. PCT/US2021/043167 dated Oct. 26, 2021, pp. 1-7.

International Search Report and Written Opinion for International Patent Application No. PCT/US2021/043177 dated Oct. 26, 2021, pp. 1-8.

Office Communication for U.S. Appl. No. 16/732,027 dated Nov. 15, 2021, pp. 1-25.

International Search Report and Written Opinion for International Patent Application No. PCT/US2021/049229 dated Nov. 16, 2021, pp. 1-8.

Office Communication for U.S. Appl. No. 16/944,064 dated Nov. 26, 2021, pp. 1-50.

Office Communication for U.S. Appl. No. 16/672,130 dated Jan. 5, 2022, pp. 1-32.

Office Communication for U.S. Appl. No. 16/915,963 dated Jan. 7, 2022, pp. 1-9.

Office Communication for U.S. Appl. No. 17/014,882 dated Jan. 25, 2022, pp. 1-6.

Arai, Taichi et al., "Preventing the creation of misleading graphs, Targeted learning tool," IPSJ SIG Technical Report [online], Mar. 12, 2018, vol. 2018-GN-104, No. 4, ISSN 2188-8744, pp. 1-17.

Negash, Solomon, "Business Intelligence," Communications of the Association for Information Systems, 2004, vol. 13, pp. 177-195.

Eckerson, Wayne W., "Performance Dashboards Measuring, Monitoring, and Managing Your Business," Business Book Summaries, 2012, pp. 1-11.

Lizotte-Latendresse, Simon et al., "Implementing self-service business analytics supporting lean manufacturing: A state-of-the-art review," 16th IFAC Symposium-Incom, 2018, pp. 1143-1148.

Gröger, Christoph et al., "The Operational Process Dashboard for Manufacturing," SciVerse ScienceDirect, Procedia CIRP, Jul. 2013, pp. 205-210.

Yigitbasioglu, Ogan M. et al., "A review of dashboards in performance management: Implications for design and research," International Journal of Accounting Information Systems, 2012, vol. 13, pp. 41-59.

Adam, Frédéric et al., "Developing Practical Decision Support Tools Using Dashboards of Information," In: Handbook on Decision Support Systems 2. International Handbooks Information System, Springer, Berlin, Heidelberg, 2008, pp. 151-173.

Passlick, Jens et al., "A Self-Service Supporting Business Intelligence and Big Data Analytics Architecture," Proceedings of the 13th International Conference on Wirtschaftsinformatik, 2017, pp. 1126-1140.

(56) References Cited

OTHER PUBLICATIONS

Shneiderman, Ben, "The Eyes Have It: A Task by Data Type Taxonomy for Information Visualizations," Proc. Visual Languages, 1996, pp. 1-9.

Alpar, Paul et al., "Self-Service Business Intelligence," Business & Information Systems Engineering, 2016, vol. 58, pp. 151-155.

Kaur, Pawandeep et al., "A Review on Visualization Recommendation Strategies," In Proceedings of the 12th International Joint Conference on Computer Vision, Imaging and Computer Graphics Theory and Applications, 2017, vol. 3, pp. 266-273.

Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.

Zhang, Shuo et al., "Ad Hoc Table Retrieval using Semantic Similarity," IW3C2, Creative Commons CC BY 4.0 License, 2018, pp. 1553-1562.

Key, Alicia et al., "VizDeck: Self-Organizing Dashboards for Visual Analytics," SIGMOD International Conference on Management of Data, 2012, pp. 681-684.

Mackinlay, Jock, "Automating the Design of Graphical Presentations of Relational Information," ACM Transactions on Graphics, 1986, vol. 5, No. 2, pp. 110-141.

Touma, Rizkallah et al., "Supporting Data Integration Tasks with Semi-Automatic Ontology Construction," DOLAP '15: Proceedings of the ACM Eighteenth International Workshop on Data Warehousing and OLAP, 2015, pp. 89-98.

Mazumdar, Suvodeep et al., "A Knowledge Dashboard for Manufacturing Industries," ESWC 2011 Workshops, LNCS 7117, 2012, pp. 112-124.

Matera, Maristella et al., "PEUDOM: A Mashup Platform for the End User Development of Common Information Spaces," ICWE 2013, LNCS 7977, 2013, pp. 494-497.

Theorin, Alfred et al., "An Event-Driven Manufacturing Information System Architecture," IFAC/IEEE Symposium on Information Control Problems in Manufacturing, 2015, pp. 1-9.

Lennerholt, Christian et al., "Implementation Challenges of Self Service Business Intelligence: A Literature Review," Proceedings of the 51st Hawaii International Conference on System Sciences, 2018, pp. 5055-5063.

Elias, Micheline et al., "Exploration Views: Understanding Dashboard Creation and Customization for Visualization Novices," INTERACT 2011, Part IV, LNCS 6949, 2011, pp. 274-291.

Buccella, Agustina et al., "Ontology-Based Data Integration Methods: A Framework for Comparison," Revista Colombiana de Computación, 2005, vol. 6, No. 1, pp. 1-24.

Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.

Palpanas, Themis et al., "Integrated model-driven dashboard development," Information Systems Frontiers, 2007, vol. 9, pp. 1-14.

Resnick, Marc L., "Building The Executive Dashboard," Proceedings of the Human Factors and Ergonomics Society 47th Annual Meeting, 2003, pp. 1639-1643.

Sarikaya, Alper et al., "What Do We Talk About When We Talk About Dashboards?," IEEE Transactions on Visualization and Computer Graphics, 2018, pp. 1-11.

Boury-Brisset, Anne-Claire, "Ontology-based Approach for Information Fusion," Proceedings of the Sixth International Conference on Information Fusion, 2003, vol. 1, pp. 522-529.

Park, Laurence A. F. et al., "A Blended Metric for Multi-label Optimisation and Evaluation," ECML/PKDD, 2018, pp. 1-16.

Kintz, Maximilien, "A Semantic Dashboard Description Language for a Process-oriented Dashboard Design Methodology," 2nd International Workshop on Mode-based Interactive Ubiquitous Systems, 2012, pp. 1-6.

Bergamaschi, Sonia et al., "A Semantic Approach to ETL Technologies," Data & Knowledge Engineering, 2011, pp. 1-24.

Office Communication for U.S. Appl. No. 16/368,390 dated Mar. 2, 2020, pp. 1-8.

International Search Report and Written Opinion for International Patent Application No. PCT/US2020/038157 dated Oct. 6, 2020, pp. 1-8.

International Search Report and Written Opinion for International Patent Application No. PCT/US2020/057780 dated Feb. 2, 2021, pp. 1-8.

Barowy, Daniel W. et al., "ExceLint: Automatically Finding Spreadsheet Formula Errors," In Proceedings of the ACM Programming Languages 2, OOPSLA, 2018, Article 148, pp. 1-26.

Barowy, Daniel W. et al., "CheckCell: Data Debugging for Spreadsheets," ACM SIGPLAN Notices, 2014, vol. 49, Iss. 10, pp. 507-523.

Donaldson, Alastair F. et al., "Automated Testing of Graphics Shader Compilers," in Proceedings of the ACM Programming Languages 1, OOPSLA, 2017, Article 93, pp. 1-29.

Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.

Gotz, David et al., "Visualization Model Validation via Inline Replication," Information Visualization, 2019, pp. 405-425.

Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.

Guo, Yue et al., "What You See is Not What You Get!: Detecting Simpson's Paradoxes During Data Exploration," In ACM SIGMOD Workshop on Human-in-the-Loop Data Analytics (HILDA), 2017, Article 2, pp. 1-5.

Hynes, Nick et al., "The Data Linter: Lightweight, Automated Sanity Checking for ML Data Sets," In NIPS: Workshop on Systems for ML and Open Source Software, 2017, pp. 1-7.

Kindlmann, Gordon et al., "An Algebraic Process for Visualization Design," IEEE Transactions on Visualization and Computer Graphics, 2014, vol. 20, No. 12, pp. 2181-2190.

Kirby, Robert M. et al., "The Need for Verifiable Visualization," IEEE Computer Graphics and Applications, 2008, vol. 28, No. 5, pp. 78-83.

McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.

Muşlu, Kivanç et al., "Preventing Data Errors with Continuous Testing," In Proceedings of the 2015 International Symposium on Software Testing and Analysis, ACM, 2015, pp. 373-384.

Salimi, Babak et al., "Bias in OLAP Queries: Detection, Explanation, and Removal." In Proceedings of the 2018 International Conference on Management of Data, ACM, 2018, pp. 1021-1035.

Tang, Nan et al., "Towards Democratizing Relational Data Visualization," In Proceedings of the 2019 International Conference on Management of Data, ACM, 2019, pp. 2025-2030.

Wall, Emily et al., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.

Wickham, Hadley et al., "Graphical Inference for Infovis," IEEE Transactions on Visualization and Computer Graphics 16, 2010, pp. 973-979.

Anand, Anushka et al., "Automatic Selection of Partitioning Variables for Small Mulitiple Displays," IEEE Transactions on Visualization and Computer Graphics, 2015, vol. 22, Iss. 1, pp. 669-677.

Anonymous, "Glitchart: When charts attack," https://glitch-chart.tumblr.com/, 2019, Accessed Feb. 5, 2020, pp. 1-1.

Armstrong, Zan et al., "Visualizing Statistical Mix Effects and Simpson's Paradox," IEEE Transactions on Visualization and Computer Graphics, 2014, vol. 20, No. 12, pp. 2132-2141.

Barr, Earl T. et al., "The Oracle Problem in Software Testing: A Survey," IEEE Transactions on Software Engineering, 2015, vol. 41, No. 5, pp. 507-525.

(56) References Cited

OTHER PUBLICATIONS

Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization Techniques Using the Data State Reference Model," In IEEE Symposium on Information Visualizations, 2000, pp. 69-75.
Chiw, Charisee et al., "DATm: Diderot's Automated Testing Model," In IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1982, vol. 216, No. 4550, pp. 1138-1141.
Cockburn, Andy et al., "Hark No More: On the Preregistration of CHI Experiments," In Proceedings of the 2018 CHI Conference on Human Factors in Computing Systems, ACM, 2018, pp. 1-12.
Correll, Michael, "Ethical Dimensions of Visualization Research," In Proceedings of the 2019 CHI Conference on Human Factors in Computing Systems, ACM, 2019, pp. 1-13.
Correll, Michael et al., "Truncating the Y-Axis: Threat or Menace?," arXiv preprint arXiv:1907.02035, 2019, pp. 1-12.
Correll, Michael et al., "Surprise! Bayesian Weighting for De-Biasing Thematic Maps," IEEE Tranactions on Visualization and Computer Graphics, 2016, pp. 1-10.
Correll, Michael et al., "Black Hat Visualization," In IEEE VIS: Workshop on Dealing With Cognitive Biases in Visualizations, 2017, pp. 1-4.
Correll, Michael et al., "Looks Good to Me: Visualizations As Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Asscociation, 2018, pp. 61-65.
D'Ignazio, Catherine et al., "Feminist Data Visualization," In IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the jackknife," The Annals of Statistics, 1979, vol. 7, No. 1, pp. 1-26.
Filipov, Veutchko et al., "CV3: Visual Exploration, Assessment, and Comparison of CVs," In Computer Graphics Forum, Wiley Online Library, 2019, pp. 107-118.
Ford, Brian, "Write-Good: Naive Linter for English Prose," https://github.com/btford/write-good Accessed: Feb. 6, 2020, pp. 1-6.
Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," In Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.
Hibbard, William L. et al., "A Lattice Model for Data Display," In Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How to Lie With Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and credible data," Information Visualization, 2011, vol. 10, No. 4, pp. 271-288.
Kandel, Sean et al., "Profiler: Integrated Statistical Analysis and Visualization for Data Quality Assessment," In Proceedings of the International Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.
Kindlmann, Gordon et al., "Algebraic Visualization Design for Pedagogy," IEEE VIS: Workshop on Pedagogy of Data Visualization, 2016, pp. 1-5.
Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.
Kong, Ha-Kyung et al., "Trust and Recall of Information across Varying Degrees of Title—Visualization Misalignment," In Proceedings of the 2019 CHI Conference on Human Factors in Computing Systems, ACM, 2019, 346, pp. 1-13.
Amperser Labs, "Proselint: A linter for prose," http://proselint.com/, Accessed: Feb. 10, 2020, pp. 1-3.
Lavigne, Sam et al., "Predicting Financial Crime: Augmenting the Predictive Policing Arsenal," arXiv preprint arXiv:1704.07826, 2017, pp. 1-8.
Ziemkiewicz, Caroline et al., "Embedding Information Visualization Within Visual Representation," In Advances in Information and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," In proceedings of the 2017 International Conference on Management of Data, ACM, 2016, pp. 527-540.
Lundgard, Alan et al., "Sociotechnical Considerations for Accessible Visualization Design," IEEE Transactions on Visualization and Computer Graphics, 2019, pp. 1-5.
Lunzer, Aran et al., "It Ain't Necessarily So: Checking Charts for Robustness," IEEE VisWeek Poster Proceedings, 2014, pp. 1-3.
Lupi, Giorgia, "Data Humanism: The Revolutionary Future of Data Visualization," Print Magazine 30, 2017, pp. 1-10.
Mackinlay, Jock et al., "Snow Me: Automatic Presentation for Visual Analysis," IEEE Transactions on Visualization and Computer Graphics, 2007, vol. 13, No. 6, pp. 1137-1144.
Matejka, Justin et al., "Same Stats, Different Graphs: Generating Datasets with Varied Appearance and Identical Statistics Through

(56) References Cited

OTHER PUBLICATIONS

Simulated Annealing," In Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization and Computer Graphics, 2013, vol. 19, No. 9, pp. 1526-1538.
Mayr, Eva et al., "Trust in Information Visualization," In EuroVis Workshop on Trustworthy Visualization (TrustVis), Robert Kosara, Kal Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions on Visualization and Computer Graphics, 2017, vol. 23, No. 6, pp. 1-12.
Moere, Andrew Vande, "Towards Designing Persuasive Ambient Visualization," In Issues in the Design & Evaluation of Ambient Information Systems Workshop, Citeseer, 2007, pp. 48-52.
Moritz, Dominik et al., "Formalizing Visualization Design Knowledge as Constraints: Actionable and Extensible Models in Draco," IEEE Transactions on Visualization and Computer Graphics, 2018, vol. 25, No. 1, pp. 438-448.
Newman, George E. et al., "Bar graphs depicting averages are perceptually misinterpreted: The within-the-bar bias," Psychonomic Bulletin & Review, 2012, vol. 19, No. 4, pp. 601-607.
Onuoha, Mimi, "On Missing Data Sets," https://github.com/mimionuoha/missing-datasets, Accessed: Feb. 10, 2020, pp. 1-3.
Pandey, Anshul Vikram et al., "How Deceptive are Deceptive Visualizations?: An Empirical Analysis of Common Distortion Techniques," In Proceedings of the 33rd Annual ACM Conference on Human Factors in Ciomputing Systems, ACM, 2015, pp. 1469-1478.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Plaisant, Catherine, "Information Visualization and the Challenge of Universal Usability," In Exploring Geovisualization, Elsevier, 2005, pp. 1-19.
Pu, Xiaoying et al., "The Garden of Forking Paths in Visualization: A Design Space for Reliable Exploratory Visual Analyics: Position Paper," In IEEE VIS: Evaluation and Beyond-Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An Interactive Data Cleaning System," In Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, pp. 1-13.
Rogowitz, Bernice E. et al., "The "Which Blair Project": A Quick Visual Method for Evaluating Perceptual Color Maps," In IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of Interactive Graphics," IEEE Transactions on Visualization and Computer Graphics, 2016, vol. 23, No. 1, pp. 341-350.
Segura, Sergio et al., "A Survey on Metamorphic Testing," IEEE Transactions on Software Engineering, 2016, vol. 42, No. 9, pp. 805-824.
Song, Hayeong et al., "Where's My Data? Evaluating Visualizations with Missing Data," IEEE Transactions on Visualization and Computer Graphics, 2018, vol. 25, No. 1, pp. 914-924.
Srinivasan, Arjun et al., "Augmenting Visualizations with Interactive Data Facts to Facilitate Interpretation and Communication," IEEE Transactions on Visualization and Computer Graphics, 2018, vol. 25, No. 1, pp. 672-681.
Stonebraker, Michael et al., "Data Duration at Scale: The Data Tamer System," In Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How to Fix Them)," ACM Interactions, 2018, vol. 25, No. 4, pp. 26-33.
Tableau, "Tableau Prep," https://www.tableau.com.products/prep/, 2020, pp. 1-13.
Trifacta, "Trifacta," https://www.trifacta.com/, 2020, pp. 1-8.
Trulia, "New York Real Estate Market Overview," https://www.trulia.com/real_estate/New_York-New_York/, 2020, Accessed: Feb. 11, 2020, pp. 1-3.
Valdez, André Calero et al., "A Framework for Studying Biases in Visualization Research," 2017, pp. 1-5.
Van Wijk, Jarke J., "The Value of Visualization," In VIS 05, IEEE Visualization, 2005, IEEE, pp. 79-86.
Vanderplas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2013, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization and Computer Graphics, 2019, pp. 1-12.
Zgraggen, Emanuel et al., "Investigating the Effect of the Multiple Comparisons Problem in Visual Analysis," In Proceedings of the 2018 CHI Conference on Human Factors in Computing Systems, ACM, 2018, pp. 1-12.
International Search Report and Written Opinion for International Patent Application No. PCT/US2020/050722 dated Nov. 24, 2020, pp. 1-6.
Office Communication for U.S. Appl. No. 17/014,882 dated Apr. 27, 2021, pp. 1-27.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.
Wang, Yun et al., "DataShot: Automatic Generation of Fact Sheets from Tabular Data," IEEE Transactions on Visualization and Computer Graphics, vol. 26, No. 1, Aug. 2019, pp. 1-11.

(56) References Cited

OTHER PUBLICATIONS

Wang Baldonado, Michelle Q. et al., "Guidelines for Using Multiple Views in Information Visualization," AVI '00, In Proceedings of the Working Conference on Advanced Visual Interfaces, May 2000, pp. 1-10.

Chen, Xi et al., "Composition and Configuration Patterns in Multiple-View Visualizations," arXiv preprint, arXiv:2007.15407, Aug. 2020, pp. 1-11.

Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

Office Communication for U.S. Appl. No. 16/732,027 dated Feb. 25, 2022, pp. 1-6.

Office Communication for U.S. Appl. No. 16/903,967 dated Mar. 18, 2022, pp. 1-11.

Office Communication for U.S. Appl. No. 16/944,064 dated Mar. 22, 2022, pp. 1-10.

Office Communication for U.S. Appl. No. 16/915,963 dated Mar. 23, 2022, pp. 1-4.

International Search Report and Written Opinion for International Patent Application No. PCT/US2022/012907 dated Mar. 16, 2022, pp. 1-13.

Office Communication for U.S. Appl. No. 16/915,963 dated Apr. 26, 2022, pp. 1-9.

Office Communication for U.S. Appl. No. 16/672,130 dated May 19, 2022, pp. 1-33.

Office Communication for U.S. Appl. No. 17/014,882 dated Jun. 9, 2022, pp. 1-8.

Office Communication for U.S. Appl. No. 16/732,027 dated Jun. 14, 2022, pp. 1-18.

Office Communication for U.S. Appl. No. 17/158,911 dated Jun. 28, 2022, pp. 1-29.

Office Communication for U.S. Appl. No. 16/672,130 dated Aug. 2, 2022, pp. 1-5.

\* cited by examiner

```
{
    "data":{
        "url": "$$datasource/events.db},
        "mark": "number",
        "encoding": {
            "value":{
                "field": "SUM(cases)",
                "type": "integer",
                "color": "red"
            },
        ...
        }
    }
}
```
— 702

```
{
    "data": {
        "data-model": "events.db",
        "display": [
            {"Seattle": {
                "field": "seattle_cases)",
                "type": "bar",
                "color": "red"
            }},
            {"Tacoma": {
                "field": "tacoma_cases)",
                "type": "bar",
                "color": "blue"
            }}
        ]
    }
}
```
— 704

*Fig. 7*

PROVIDING AND SURFACING METRICS FOR VISUALIZATIONS

TECHNICAL FIELD

The present invention relates generally to data analysis, and more particularly, but not exclusively to, generating metrics based on visualizations.

BACKGROUND

Organizations are generating and collecting an ever-increasing amount of data. This data may be associated with disparate parts of the organization, such as, consumer activity, manufacturing activity, customer service, server logs, or the like. In some cases, organizations may develop a variety of different data sources or data models to represent the information they may be interested in analyzing. In some cases, organizations may employ computer-based applications or tools to generate user interfaces, such as, dashboards that may provide visualizations, or the like, to help enable improved reasoning about some or all of their data. In some cases, dashboards may provide current or real-time views of data. While dashboards may help users determine the state of selected key performance indicators, dashboards may omit visualizations that provide historical context, trends, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7 illustrates example visualization specifications for providing and surfacing metrics for visualizations in accordance with one or more of the various embodiments;

DETAILED DESCRIPTION OF VARIOUS EMBODIMENTS

Figure 1:
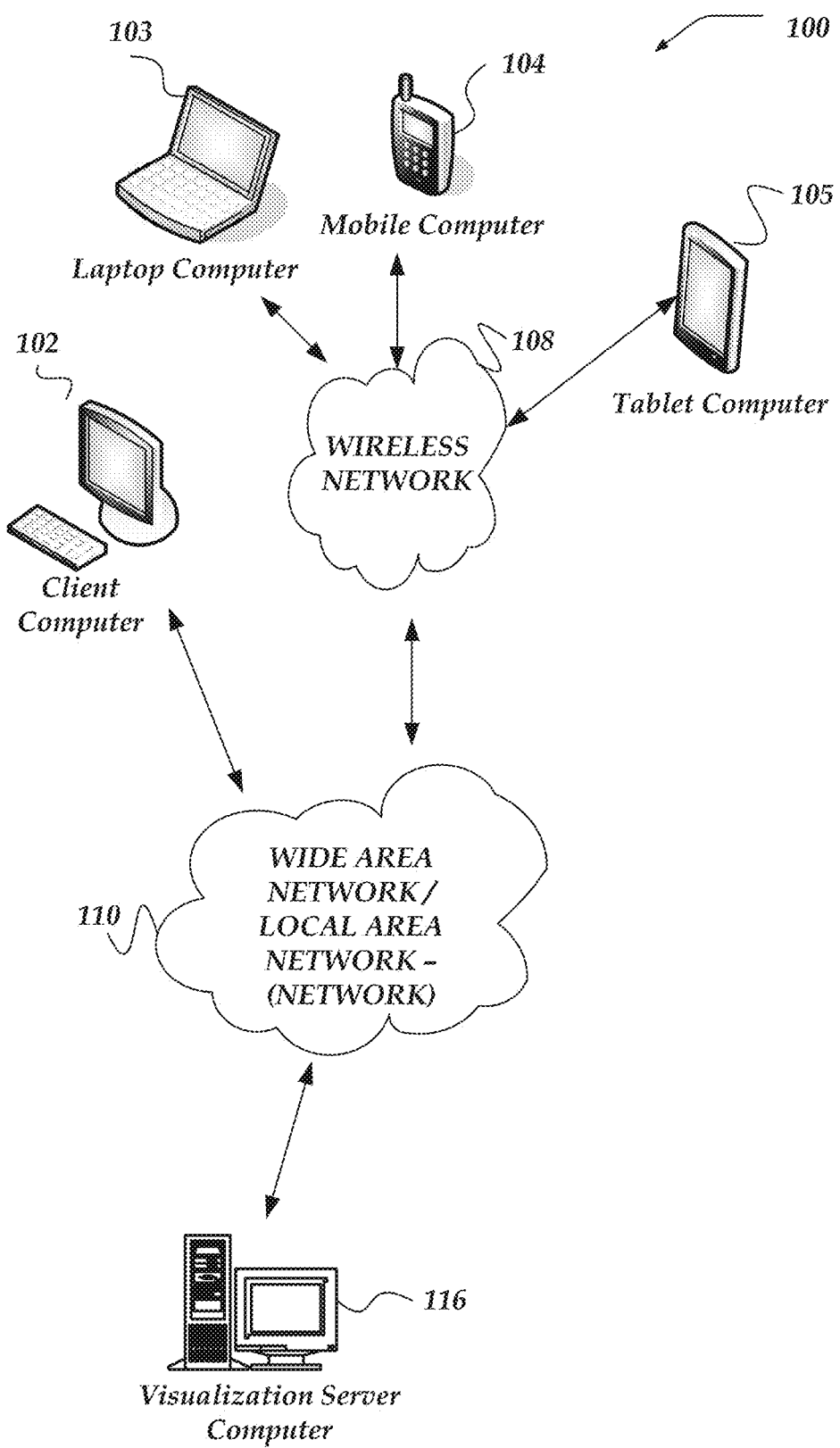
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, no-sql, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy to understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein, the term "data model field" refers to named or nameable properties or features of a data model. Data model fields are analogous to columns in a database tables, nodes in a graph, Java class attributes, and so on. For example, a data model that corresponds to an employee database table, may have data model fields, such as, name, email-address, telephone-number, employee-id, or the like.

As used herein the term "data object" refers to one or more entities or data structures that comprise data models. In some cases, data objects may be considered portions of the data model. Data objects may represent individual instances of items or classes or kinds of items.

As used herein the term "data field" refers to a named or nameable property or attribute of a data object. In some cases, data fields may be considered analogous to class members of an object in object-oriented programming.

As used herein the term "visualization model" refers to one or more data structures that visualization engines may employ to generate visualizations for display on one or more hardware displays. Visualization models may define various features or objects that visualization engines may render into a displayed visualization including styling or user interface features that may be made available to non-authoring users.

As used herein, the term "metric" refers to various quantifiable or measurable values derived from a visualization. In some cases, the type of metrics that are available may depend on the visualization being analyzed or monitored.

As used herein, the term, "source visualization" refers to visualizations that are being analyzed or monitored to provide one or more metric values. Otherwise, source visualizations may be considered normal/regular visualization.

As used herein, the term, "metric visualization" refers to visualizations that display metric information or metric values derived from source visualizations. Otherwise, metric visualizations may be considered visualizations.

As used herein the term "metric visualization model" refers to one or more data structures that visualization engines may employ to generate metric visualizations for display on one or more hardware displays. Otherwise, metric visualization models may be considered visualization models.

As used herein the term "metric data model" refers to one or more data structures that provide a representation of an underlying data used for metric visualizations. Otherwise, metric data models may be considered data models.

As used herein the term "source visualization model" refers to one or more data structures that visualization engines may employ to generate source visualizations for display on one or more hardware displays. Otherwise, source visualization models may be considered visualization models.

As used herein the term "source data model" refers to one or more data structures that provide a representation of an underlying data used for source visualizations. Otherwise, source data models may be considered data models.

As used herein the term "visualization specification," or "visualization specification information" refers to computer readable information that visualization engines may employ to generate visualization models, including source visualization models or metric visualization models. For example, a visualization specification may be a JSON file or XML file that defines one or more characteristics of a visualization. In some cases, the visualization specification may serve as the visualization model. In other cases, the visualization specification or visualization specification information may be determined from a visualization model using introspection, reflection, de-compilation, or the like.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to generating metrics based on visualizations using one or more processors that execute one or more instructions to perform as described herein.

In one or more of the various embodiments, a dashboard that may be associated with one or more source visualizations that each display a current value of one or more metrics from one or more source visualization models may be provided such that each source visualization corresponds to a specification.

In one or more of the various embodiments, evaluating each specification to determine one or more characteristics of each source visualization such that the one or more source visualizations may be classified based on one or more classifiers and the one or more characteristics.

In one or more of the various embodiments, evaluating each specification may include: iterating through the one or more classifiers to determine a class of visualizations that may correspond to the one or more source visualizations; executing one or more actions to determine the one or more characteristics of each source visualization based on its corresponding class; excluding each of the one or more source visualizations that remains unclassified; or the like.

In one or more of the various embodiments, the one or more metrics for each classified source visualization may be determined based on the one or more classifiers.

In one or more of the various embodiments, determining the one or more metrics may include, determining one or more of one or more single value metrics or one or more multiple valued metrics, wherein each of the one or more multiple valued metrics are single metrics that are divided into two or more categories.

In one or more of the various embodiments, one or more metric profiles that correspond to the one or more metrics may be generated based on the one or more classifiers.

In one or more of the various embodiments, the one or more source visualization models may be sampled to provide one or more values of the one or more metrics such that a sampling rate may be based on the one or more metric profiles. In one or more of the various embodiments, sampling the one or more source visualization models may include sampling the one or more source visualization models while the dashboard or the one or more source visualizations may be inactive such that the inactive dashboard or the one or more inactive source visualizations may be omitted from being displayed.

In one or more of the various embodiments, the one or more sampled values may be stored with one or more time values in a metric data store such that the one or more time values may correspond to when the one or more values were sampled.

In one or more of the various embodiments, one or more metric visualizations may be generated based on the one or more values and the one or more time values such that the one or more metric visualizations display one or more previously sampled values of the one or more metrics. In some embodiments, displaying the one or more metric visualizations may include displaying the one or more metric visualizations in the dashboard or in another user interface.

In one or more of the various embodiments, one or more anomaly detectors that are arranged to identify one or more statistical anomalies that are present in the one or more values of the one or more metrics may be provided.

In one or more of the various embodiments, in response to determining one or more statistical anomalies based on the one or more anomaly detectors further actions may be performed, including: providing one or more alerts that include one or more of one or more notifications, one or more alerts, or one or more reports; communicating the one or more alerts to one or more of one or more responsible parties or one or more services; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/ wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
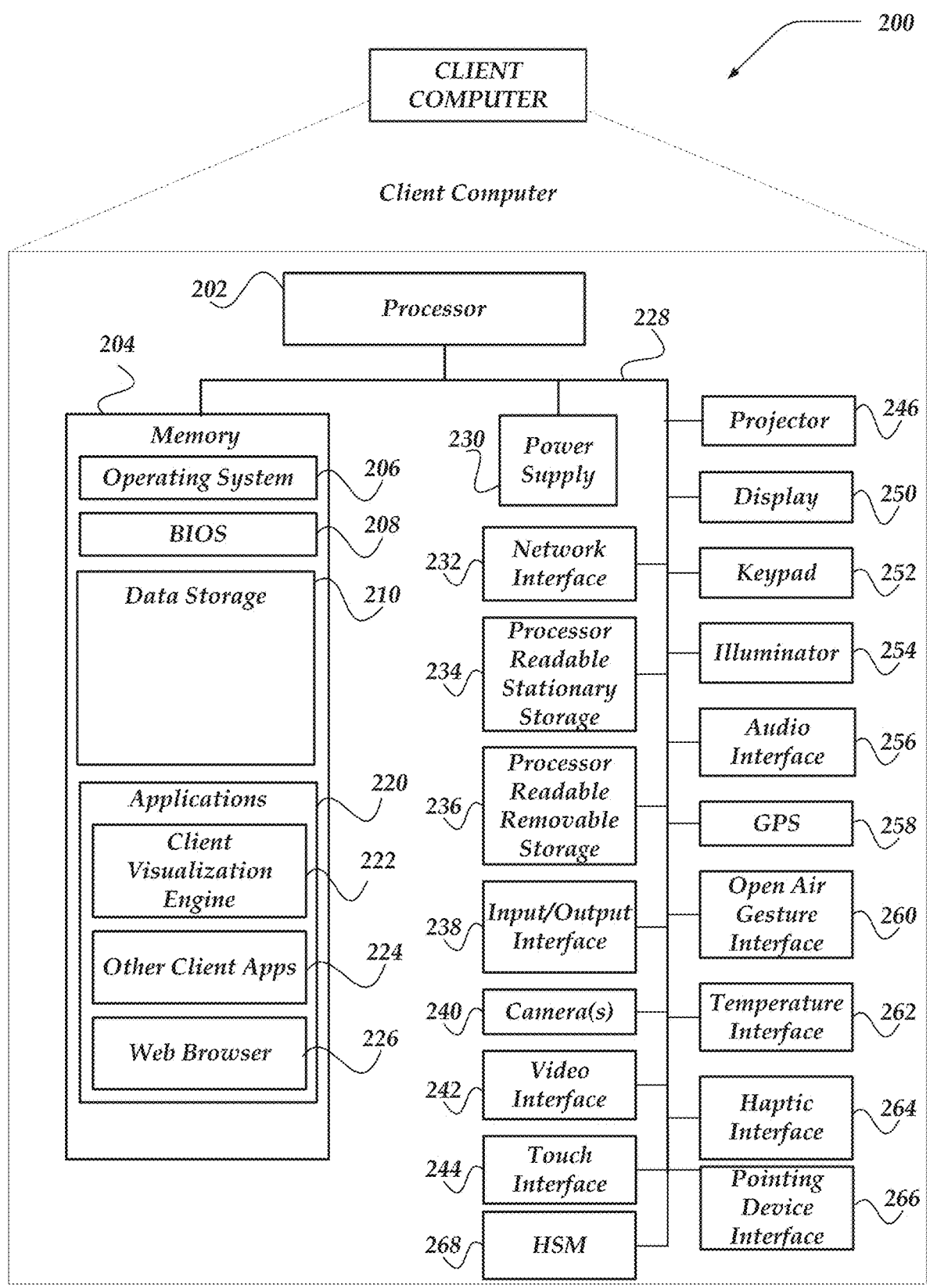
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer.

And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, visualization client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, visualization client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
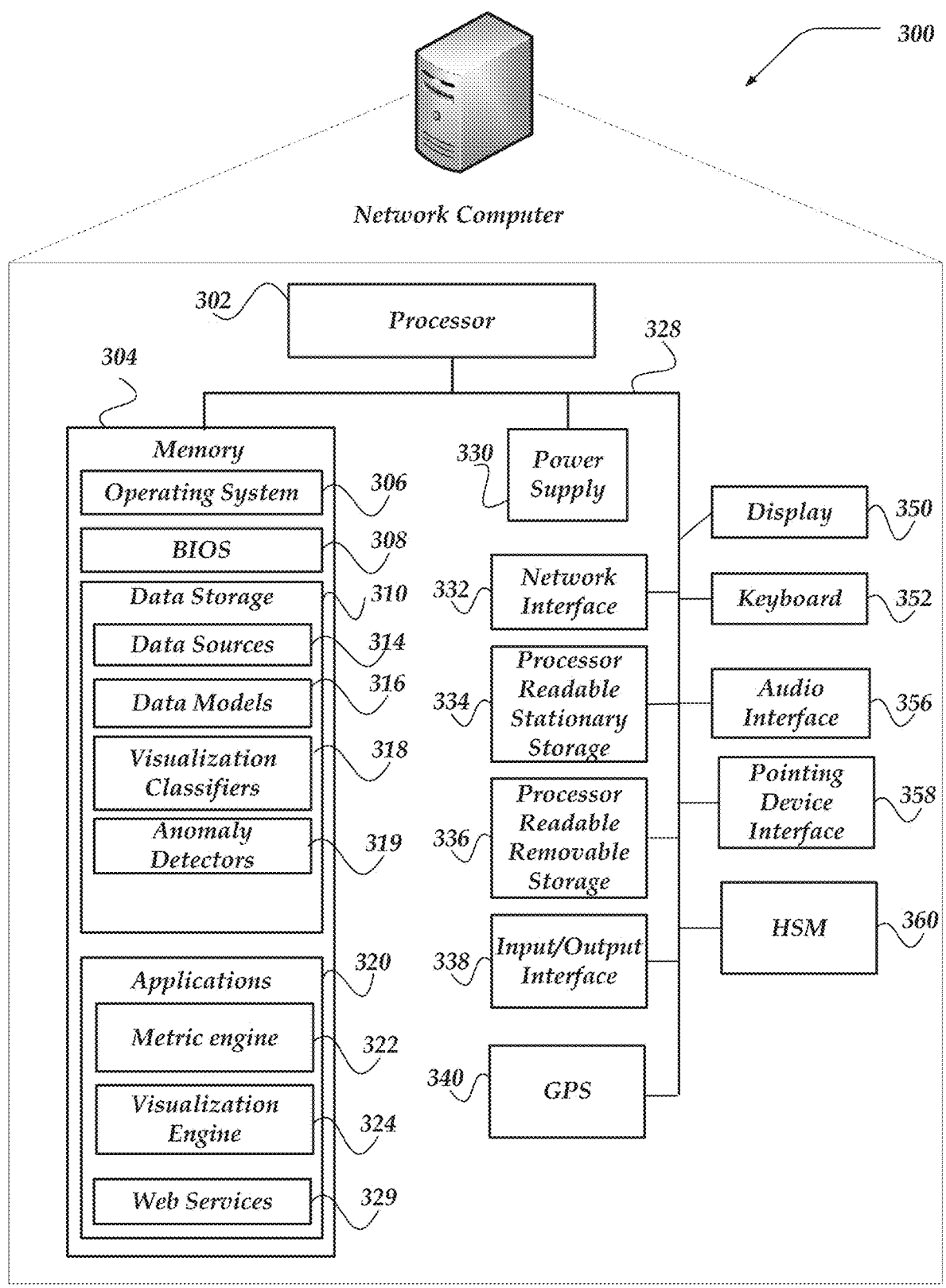
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of event analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USBTM, FirewireTM, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, metric engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, data models 316, metric models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include metric engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, metric engine 322, visualization engine 324, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to metric engine 322, visualization engine 324, other applications 329, or the like, may be provisioned and de-commissioned automatically.

Also, in one or more of the various embodiments, metric engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
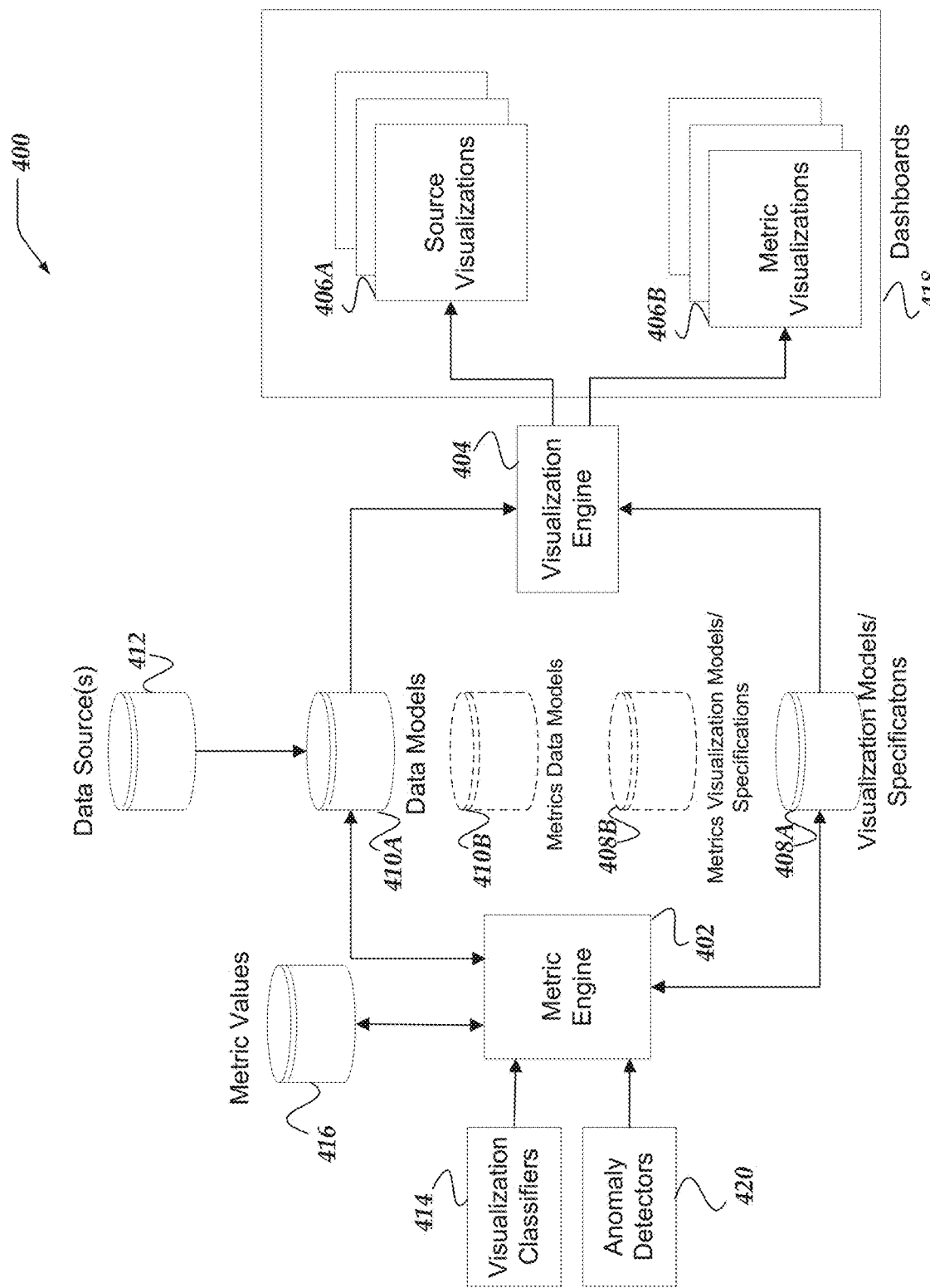
FIG. 4 illustrates a logical architecture of a system for providing and surfacing metrics for visualizations in accordance with one or more of the various embodiments. In one or more of the various embodiments.

FIG. 4 illustrates a logical architecture of system 400 for providing and surfacing metrics for visualizations in accordance with one or more of the various embodiments. In one or more of the various embodiments, system 400 may be a visualization platform arranged to include various components including: metric engine 402; visualization engine 404; source visualizations 406A; metrics visualizations 406B, visualization models/specifications 408A; metrics visualization models/specifications 408B, data models 410A, metrics data models 410B; data sources 412; visualization classifiers 414, metric values 416, dashboard 418, anomaly detectors 420, or the like.

In one or more of the various embodiments, data sources 412 represent a source of raw data, records, data items, or the like, that metric engine 402 may employ to enable users to generate or modify data models, such as, data models 410.

In one or more of the various embodiments, data models, such as, data models 410A may be data structures, or the like, that provide one or more logical representations of the information stored in one or more data sources, such as, data source 412. In some embodiments, data models may include data objects that correspond to one or more portions of tables, views, or files in data sources. For example, in some embodiments, if data source 412 is a CSV file or a database, a data model, such as, data model 412 may be comprised of one or more data objects that may correspond to record fields in data source 412. Likewise, in some embodiments, data models may include fields that correspond to fields or attributes in data sources. For example, in some embodiments, if data source 412 is a Relational Database System (RDBMS), a data model included in data models 410A may be comprised of one or more data model fields that correspond to one or more columns or one or more tables included in data sources 412.

In some embodiments, a visualization engine, such as, visualization engine 404 may be employed to transform or map some or all of data sources 412 into data models 410A. In some embodiments, visualization engines may be arranged to employ or execute computer readable instructions provided by configuration information to determine some or all of the steps for transforming values in data sources into data models.

In some embodiments, visualization engine 404 may be employed to transform or map some or all of data sources 412 or some or all of metric values 416 into metric data models 410B. In some embodiments, visualization engines may be arranged to employ or execute computer readable instructions provided by configuration information to determine some or all of the steps for transforming object or values from data sources or metric values into data models.

Note, metric data model 410B is illustrated using dashed lines because in some embodiments, metric data models may be stored with other data models in the same data store.

In one or more of the various embodiments, visualization engines, such as, visualization engine 404 may be arranged to employ visualization models, such as, source visualization models 408A to determine the layout, styling, interactivity, or the like, for source visualizations, such as, source visualizations 406A that may be displayed to users. Also, in some embodiments, visualization engines may be arranged to employ data item values provided via data sources 412 to populate source visualizations with values based on a source data model.

Similarly, in some embodiments, visualization engines, such as, visualization engine 404 may be arranged to employ metric visualization models 408B to determine the layout, styling, interactivity, or the like, for metric visualizations, such as, metric visualizations 406B that may be displayed to users. Also, in some embodiments, visualization engines may be arranged to employ data item values provided via data sources 412 or metric values 416 to populate metrics visualizations with values based on a metric data model. Note, metric visualization models 410B is illustrated using dashed lines because in some embodiments, metric visualization models or metric visualization specifications may be stored with other visualization models/specifications in the same data store.

In one or more of the various embodiments, visualization models may be defined using one or more visualization specifications. In some embodiments, visualization specifications may include computer readable instructions, such as, formal or semi-formal rules that may correspond to visualization models. In some embodiments, visualization specifications may be used to represent or define one or more visualization models. In some embodiments, source visualization specifications may be employed to generate source visualization models or source visualizations. Likewise, in some embodiments, metric visualization specifications may be employed to generate metric visualization models or metric visualizations.

In one or more of the various embodiments, visualization engines may be arranged to generate visualizations or visualization models based on visualization specifications. In one or more of the various embodiments, visualization engines or metric engines may be arranged to support one or more different types of visualization specifications. Accordingly, in some embodiments, metric engines or visualization engines may be arranged to employ rules, grammars, or the like, provided via configuration information to interpret a given visualization specification.

In some embodiments, dashboard user interfaces, such as, dashboards 418, may be a common form of visual analytics that may often be employed in business intelligence applications, informatics, or industrial monitoring as well as many other domains or analytical tasks. In some embodiments, these visual displays may take many forms and styles based on the data acquired and the information needs of the viewer or analyst. In some cases, due to this variety, there may be a lack of consistent, agreed-to definitions for what constitutes a quality dashboard visualization. Accordingly, it may be conventional to adopt a broad view of what can be considered a dashboard including infographics, narrative elements, or the like. Herein, for some embodiments, dashboard user interfaces may be user interfaces arranged to at least include a visual display of important information that may be needed to achieve one or more objectives; consolidated and arranged on a single screen so the information can be monitored at a glance.

In some cases, dashboards may be designed to display the current status or KPIs of interest to a user or organization. In some cases, data sources or dashboards may be designed to show historical data, where the history of the changes may be apparent in how the data is stored or visualized. However, it may be often the case that the historical information is not represented anywhere. In this case, the history of the data needs to be captured and stored separately, something that may often require additional IT resourc es that may make reporting or visualization such information disadvantageous.

Accordingly, in some embodiments, metric engines, such as, metric engine 402 may be arranged to automatically determine one or more metrics in visualizations, including visualizations that are included in dashboards. In some embodiments, metric engines may be arranged to interpret the source visualization models or source visualization specifications associated with source visualizations included in the dashboards to identify one or more metrics to capture or analyze. In some embodiments, the captured or determined metrics may be stored in a data store, such as, metric values 416.

In one or more of the various embodiments, metric engines may be arranged to provide one or more metric visualization specifications or metric visualization models that enable visualization engines to display metric values in visualizations.

In some embodiments, metric engines may be arranged to automatically determine one or more metrics from monitored source visualizations. In some embodiments, metric engines may be arranged to periodically sample values of the one or more metrics and store them in metric values 416. In some embodiments, metrics may be associated with metric profiles that include additional information, such as, sample rates, data type information, metric visualization specifications (or references thereto) for displaying metric visualizations (or references thereto), or the like.

In one or more of the various embodiments, metric engines may be arranged to employ one or more visualization classifiers to classify source visualizations included in dashboards to determine how metrics may be identified or extracted. In some embodiments, visualization classifiers may be configured to recognize different classes of source visualizations to determine if key metrics may be identified. Accordingly, in some embodiments, if a metric engine can classify a source visualization, it may employ actions based on the classification to determine metrics or extract metric values associated with the source visualization. Also, in one or more of the various embodiments, classification enables metric engines to identify one or more source visualizations that are unsuitable for providing and surfacing metrics. For example, in some cases, a source visualization may be designed to report or visualize historical data. Thus, in this example, there may be no need for the metric engine attempt to duplicate the effort. Also, for example, some source visualizations may have source visualization specifications that have features that prevent automatic metric determination. For example, a source visualization specification that defines an unconventional source visualization may be determined unsuitable for automatic metric determination.

In some embodiments, visualization classifiers may be associated with metric visualization specifications or metric visualization specification templates that may be automatically employed to generate metric visualizations. Alternatively, in some embodiments, visualization specification information for specific metrics may be stored in their corresponding metric profile.

In one or more of the various embodiments, metric engines may be arranged to collect historical records of changes associated metric values. Accordingly, in some embodiments, metric visualizations may be employed to display these historical records enabling users to observe how the KPIs in their dashboards vary over time.

Further, in some embodiments, metric engines may be arranged to employ one or more anomaly detectors to identify anomalous metric values. In one or more of the various embodiments, anomaly detectors may be comprised of data structures or computer readable instructions that may be arranged to identify one or more statistical anomalies in the metric values associated with source visualizations. In one or more of the various embodiments, metric engines may be arranged to employ different anomaly detectors that may be directed to identifying different types of anomalies. Also, in some embodiments, users or organizations may be enabled to provide preference information, or the like, that metric engines may employ to determine which anomaly detectors should be used. Also, in some embodiments, users or organizations may be enabled to provide one or more parameters, threshold values, time ranges/windows, or the like, that may be employed to define one or more anomaly conditions/events. Further, in some embodiments, metric engines may be arranged to enable users or organizations to provide custom or configured anomaly detectors for their application needs. Accordingly, in some embodiments, metric engines may be arranged to determine one or more anomaly detectors from configuration information to account for local requirements or local circumstances.

In one or more of the various embodiments, if an anomaly may be detected, metric engines may be arranged to generate one or more notifications, alerts, events, reports, or the like. In some embodiments, notifications, or the like, may be provided to external services or systems that may manage the investigation the reported anomalies.

Figure 5:
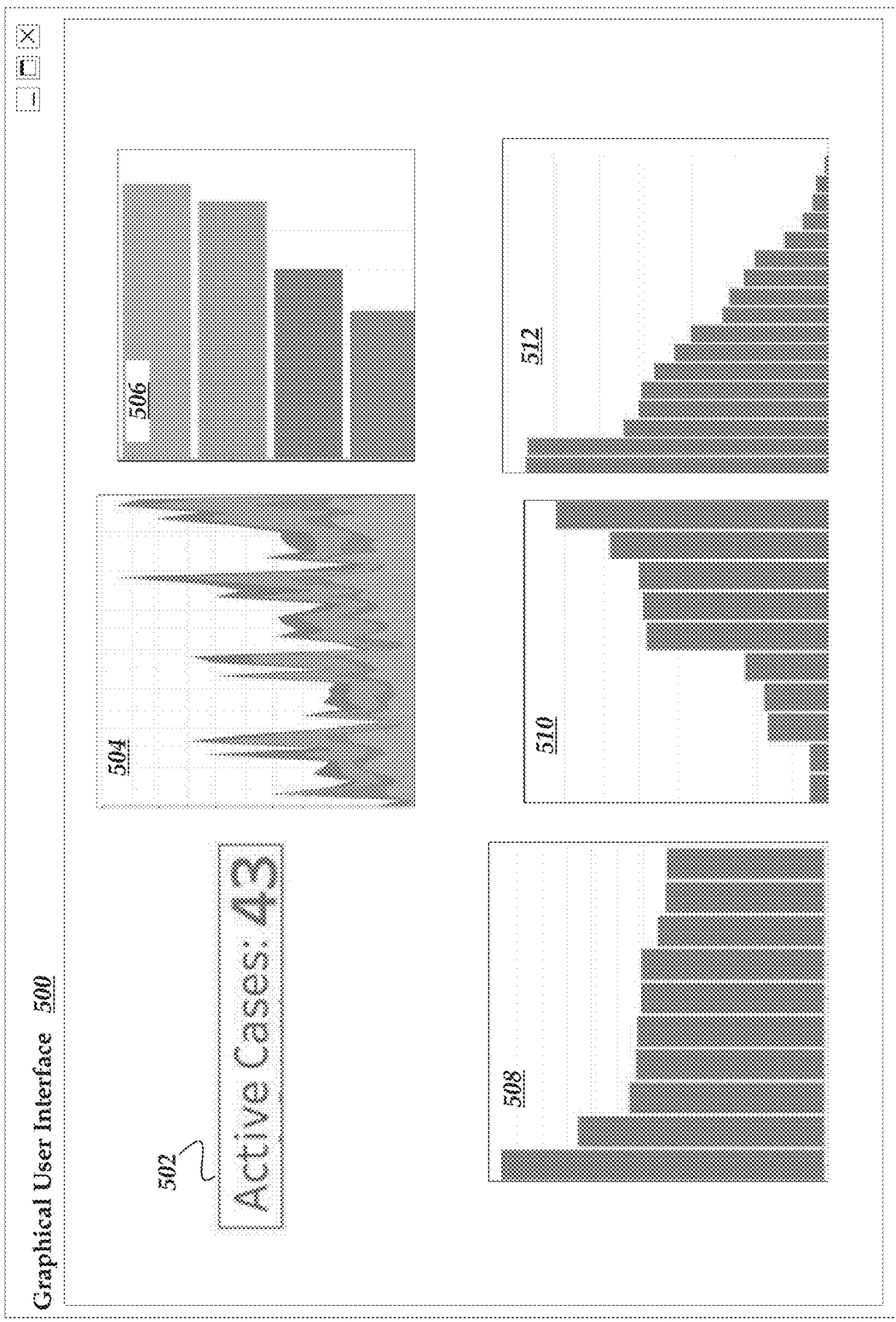
FIG. 5 illustrates a portion of a user interface that may be considered a dashboard in accordance with one or more of the various embodiments.

FIG. 5 illustrates a portion of user interface 500 that may be considered a dashboard in accordance with one or more of the various embodiments. In this example, user interface 500 includes several different visualizations that comprise a dashboard, including, source visualization 502, source visualization 504, source visualization 506, source visualization 508, source visualization 510, source visualization 512, or the like. These source visualizations may be considered to represent visualizations of various KPIs, statuses, or the like. In some cases, visualizations included in a dashboard, such as, dashboard 500 may include one or more source visualizations or one or more metric visualizations.

In one or more of the various embodiments, user interface 500 may be displayed on one or more hardware displays, such as, client computer displays, mobile device displays, or the like. In some embodiments, user interface 500 may be provided via a native application or as a web application hosted in a web browser or other similar applications. One of ordinary skill in the art will appreciate that for at least clarity or brevity many details common to commercial/production user interfaces have been omitted from user interface 500. Likewise, in some embodiments, user interfaces may be arranged differently than shown depending on local circumstances or local requirements, such as, display type, display resolution, user preferences, or the like. However, one of ordinary skill in the art will appreciate that the disclosure/description of user interface 500 is at least sufficient for disclosing the innovations included herein.

Figure 6:
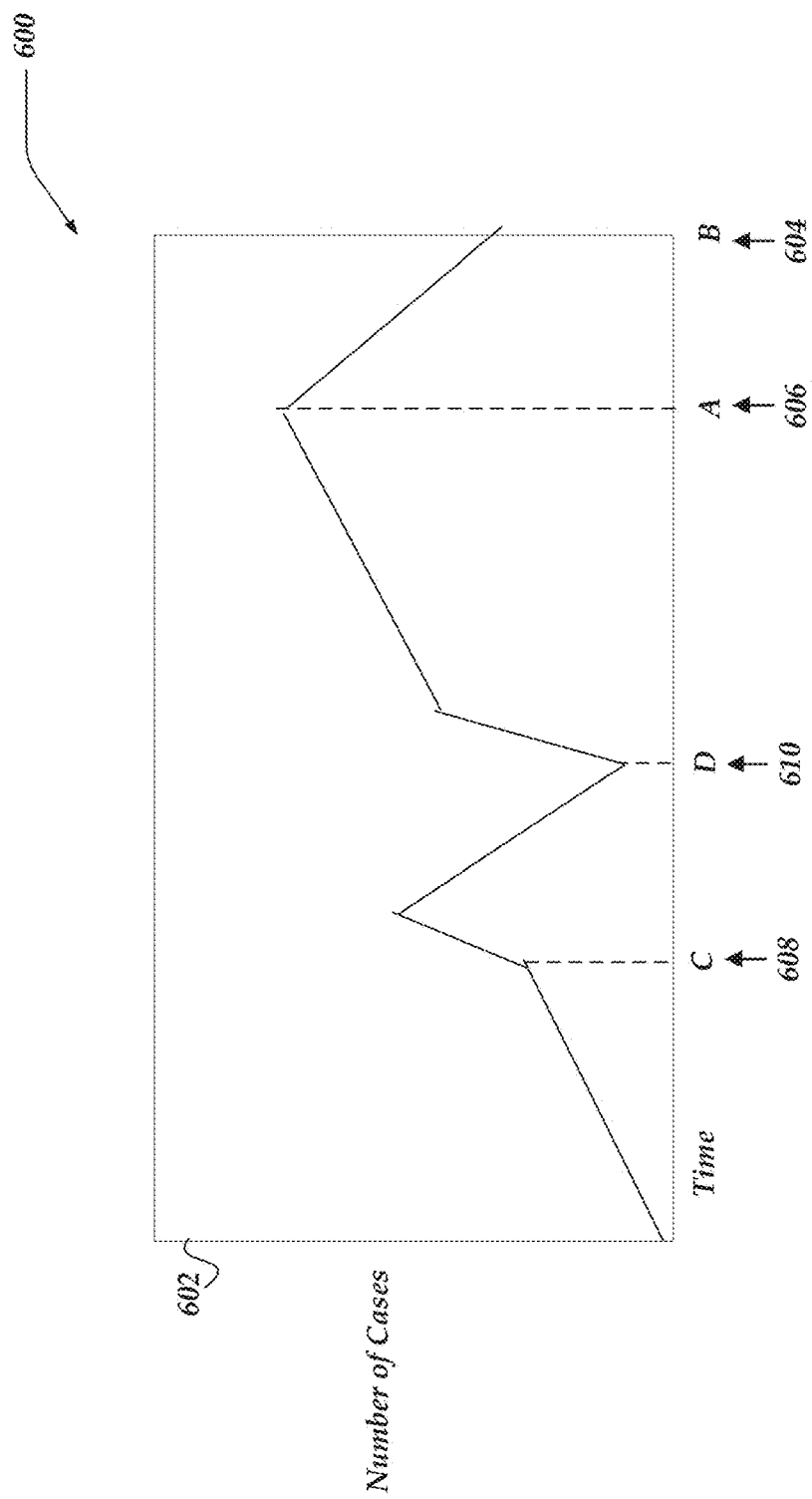
FIG. 6 illustrates a logical representation of a portion of a user interface for providing and surfacing metrics for visualizations in accordance with one or more of the various embodiments.

FIG. 6 illustrates a logical representation of a portion of user interface 600 of a metric visualization for providing and surfacing metrics for visualizations in accordance with one or more of the various embodiments. As described above, in some embodiments, metric engines may be arranged to monitor or record metrics associated with source visualizations. Accordingly, in some embodiments, metric engines may be arranged to generate metric visualizations, such as, metric visualization 602 to display historical information about one or more metrics for one or more of the source visualizations.

In this example, metric visualization 602 may be considered to be based on source visualization 502 shown in FIG. 5. In this example, for some embodiments, metric visualization 602 may be a line plot that represents the number of cases (from source visualization 502 in FIG. 5) over time. In this example, the current view of source visualization 502 showing a value of 43 cases is represented by point 604 ('B'). Accordingly, the source visualization 502 in user interface 500 is showing the current number of cases, but it does not provide context or trend information that may be of interest to users. In this example, point 606 ('A') represents an earlier time when the number of cases is more than the current value. In this example, if the user viewed the dashboard (user interface 500) at point (in time) 608 ('C') and then at point (in time) 604 ('B'), a user may have the impression that the values for source visualization 502 have been flat and smooth even the actual value represented by source visualization 502 is fluctuating wildly.

Accordingly, in some embodiments, metric engines may be arranged to automatically collect historical metric values that may be displayed to users using metric visualizations that provide users improved understanding of how their systems or organizations may be performing.

Also, in one or more of the various embodiments, metric engines may be arranged to monitor metrics to identify one or more anomalies based on the metric values. In this example, point 610 ('D') represents a low value that may be considered an anomaly. Accordingly, in this example, the metric engine may employ one or more anomaly detectors that may identify the anomalous value even if the user is not viewing the dashboard. As described above, metric engines may be arranged to generate one or more notifications, events, alerts, or the like, if anomalies may be detected.

FIG. 7 illustrates example visualization specifications for providing and surfacing metrics for visualizations in accordance with one or more of the various embodiments. As described above, visualizations (source visualizations or metric visualizations) may be defined using visualization specifications or visualization models (based on visualization specifications). Visualization specifications may come in many forms. In this example, visualization specification 702 and visualization specification 704 may be considered non-limiting examples that have been deliberately simplified here for brevity and clarity. One of ordinary skill in the art will appreciate that visualization specifications may include far more options, attributes, or the like, than depicted here. Also, one of ordinary skill in the art will appreciate that while visualization specification 702 and visualization specification 704 are represented here using a JSON-like format/syntax other formats or syntax are available. However, one of ordinary skill in the art will appreciate that these simplified visualization specifications are sufficient for at least disclosing the innovations disclosed herein.

In one or more of the various embodiments, visualization specifications may provide formal or regular syntax that define or correspond to a visualization model that a visualization engine may employ to generate visualizations for display to users. In this example, visualization specification 702 may be considered consistent with source visualization 502 in FIG. 5. For example, visualization specification 702 defines one value that has a mark of a number. Also, in this example, visualization specification 702 defines a data source, type information, color, or the like. In this example, the "field" attribute represents that the value shown in visualization is an integer represent the sum of 'cases' from the 'events.db' and that it should be colored 'red'.

Also, in this example, visualization specification 704 may be considered to be a visualization specification for a bar chart that has two bars, one for 'Seattle' cases and one for 'Tacoma' cases.

In one or more of the various embodiments, metric engines may be arranged to parse or interpret visualization specifications from different sources that may employ different syntax, definitions, or the like. In one or more of the various embodiments, metric engines may be arranged to employ parsers, grammars, or the like, provided via configuration information to process visualization specifications. Accordingly, in some embodiments, metric engines may be arranged to work with different visualization platforms that may employ different visualization specifications definitions.

In one or more of the various embodiments, metric engines may be arranged to employ one or more visualization classifiers to identify which specification format may be applicable. Also, in some embodiments, the visualization specifications may include one or more attributes that store meta-data, such as, specification type, version, vendor, author, authoring tool, or the like. Accordingly, in some embodiments, metric engines may be arranged to employ the available meta-data to determine the type of visualization specification.

In one or more of the various embodiments, metric engines may be arranged to employ visualization classifiers to identify the relevant metrics that should be determined for each source visualization. Also, in one or more of the various embodiments, visualization classifiers may include one or more heuristics to determine if the metric engine should capture historical metric values for source visualizations.

In some embodiments, if the metric engine can classify a source visualization specification, it can determine the one or more metrics of interest. Accordingly, in one or more of the various embodiments, if source visualization specifications or source visualizations can be classified such that its key metrics may be extracted, historical metric information may be collected. Otherwise, in some embodiments, historical metric information may not be collected.

Generalized Operations

FIGS. 8-12 represent generalized operations for providing and surfacing metrics for visualizations in accordance with one or more of the various embodiments. In one or more of the various embodiments, processes 800, 900, 1000, 1100, and 1200 described in conjunction with FIGS. 8-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-12 may be used for providing and surfacing metrics for visualizations in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by metric engine 322, visualization engine 324, or the like, running on one or more processors of one or more network computers.

Figure 8:
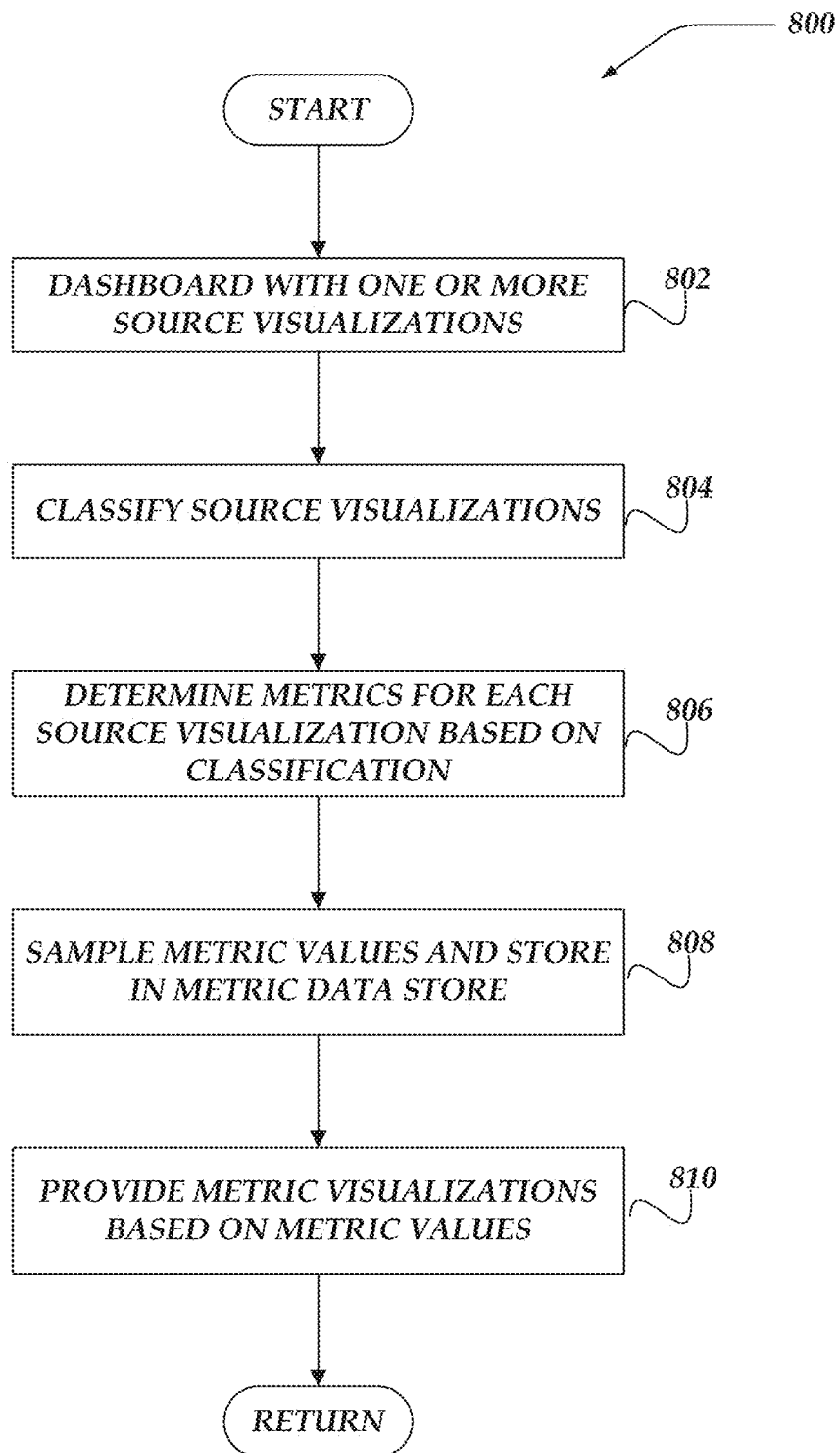
FIG. 8 illustrates an overview flowchart of a process for providing and surfacing metrics for visualizations in accordance with one or more of the various embodiments.

FIG. 8 illustrates an overview flowchart of process 800 for providing and surfacing metrics for visualizations in accordance with one or more of the various embodiments. After a start block, at start block 802, in one or more of the various embodiments, a dashboard user interface associated with one or more source visualizations may be provided to a metric engine. In one or more of the various embodiments, users may be enabled select dashboards or other source visualizations for providing and surfacing metrics. In some embodiments, metric engines may be arranged to automatically process source visualizations associated with dashboards. In some embodiments, users or organizations may be enabled to set filters, preferences, or the like, that may determine if a source visualization or dashboard may be processed for providing and surfacing metrics for display in metric visualizations.

At block 804, in one or more of the various embodiments, the metric engine may be arranged to employ one or more visualization classifiers to classify the one or more source visualizations included in the dashboard user interface. In one or more of the various embodiments, the visualization classifier may be arranged to determine if a source visualization is suitable for providing and surfacing metrics for display in metric visualizations. Also, in one or more of the various embodiments, visualization classification enables the metric engine to employ the correct parsing strategy to identify the metrics of interest from the source visualization specification.

At block 806, in one or more of the various embodiments, the metric engine may be arranged to determine one or more metrics for the one or more source visualizations based on their classification. In one or more of the various embodiments, the classification process may include identifying the metrics for a source visualization.

At block 808, in one or more of the various embodiments, the metric engine may be arranged to sample values for the metrics associated with the source visualizations. In some embodiments, the sampled metric values may be stored in a metric data store. In one or more of the various embodiments, metrics may be associated with a metric profile that may be registered with the metric engine. In some embodiments, the metric profile may include sampling information that determines how often the metric engine samples a given metric.

In some embodiments, the metric engine may be arranged to sample metric values from the source visualization or the source visualization model directly. Accordingly, in some embodiments, the metric engine may ensure that the sampled metric values match the values that would be displayed in the visualization. In some embodiments, collecting metric values directly from the source visualization models rather than from the data source relieves the metric engine from having to perform actions, such as, filtering, aggregating, averaging, grouping, sorting, or the like, that may be required to produce a given metric value. In some embodiments, a visualization engine may initiate one or more actions to retrieve data from the data source that may be used to generate the metrics being sampled, such as, connecting to the data source, providing query expressions, filtering, formatting, or the like.

At block 810, in one or more of the various embodiments, the metric engine may be arranged to provide metric visualizations based on one or more metric values. In one or more of the various embodiments, metric visualizations may be designed to display historical values of metrics. The particular metric visualization may vary depending on the metric being sampled. Also, in some embodiments, metric engines may be arranged to enable metric visualization specifications to be associated with metric visualizations. Accordingly, in some embodiments, users or organizations may be enabled to customize their metric visualizations.

Next, in one or more of the various embodiments, control may be returned to a calling process.

Figure 9:
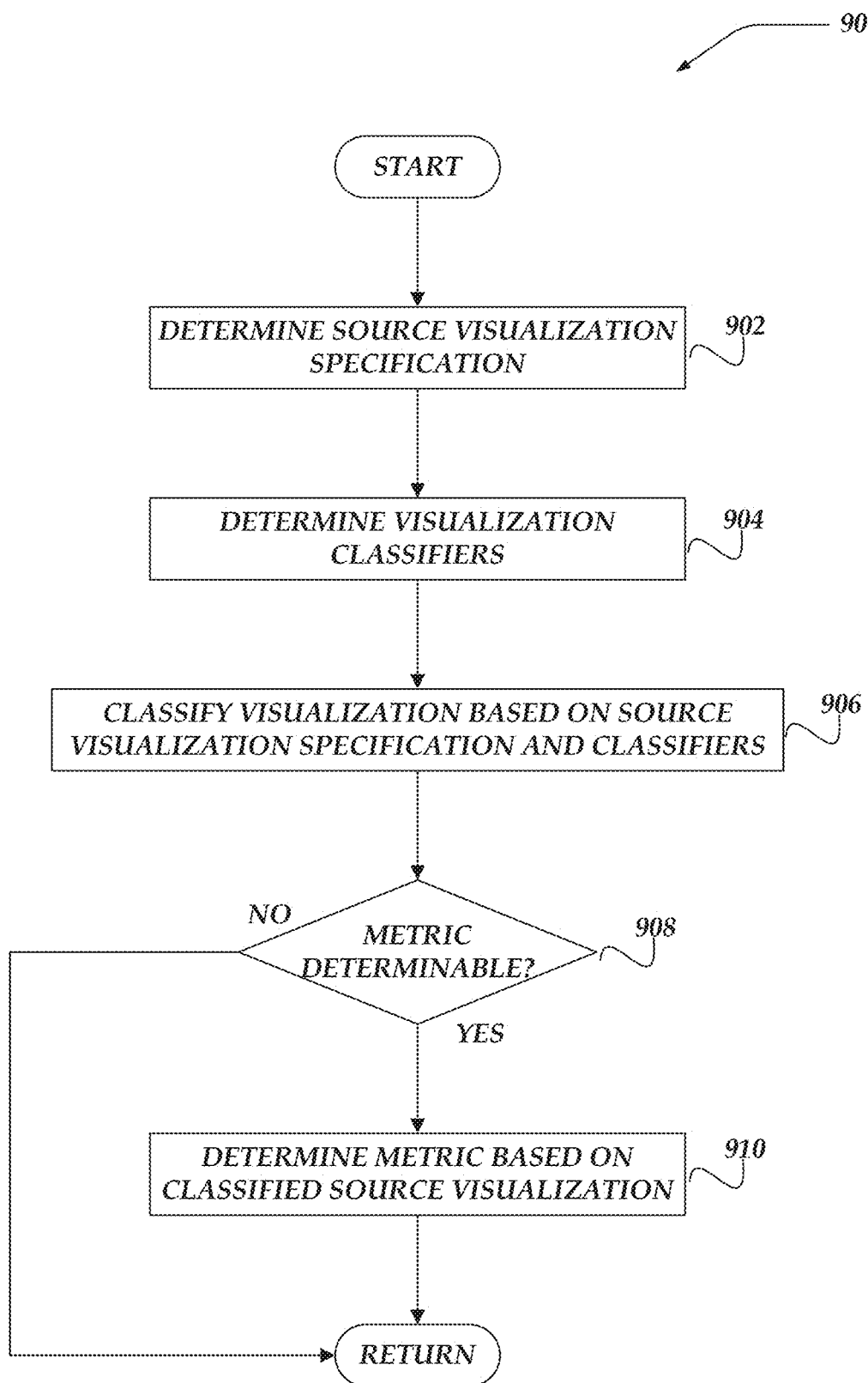
FIG. 9 illustrates a flowchart of a process for providing and surfacing metrics for visualizations in accordance with one or more of the various embodiments.

FIG. 9 illustrates a flowchart of process 900 for providing and surfacing metrics for visualizations in accordance with one or more of the various embodiments. After a start block, at start block 902, in one or more of the various embodiments, a source visualization specification associated with a source visualization may be provided to a metric engine. As described above, dashboard user interfaces may include or be associated with one or more source visualizations. As source visualizations are processed, the metric engine may be arranged to determine a source visualization specification for some or all of the source visualizations. In some cases, the source visualization specification or a reference thereto may be directly provided to the metric engine. In some cases, identifiers or references to the source visualization specification associated with the source visualization being processed may be provided.

Alternatively, in one or more of the various embodiments, metric engines may be arranged to decompile or inspect a source visualization or source visualization model to generate a source visualization specification or source visualization specification information. For example, in some embodiments, if a metric engine is provided a reference or identifier that corresponds to a source visualization model, the metric engine may be arranged to use conventional or custom reflection techniques to inspect some or all of the meta-data, components, objects, data, or the like, comprising the source visualization models to determine or generate source visualization specification information. Accordingly, in some embodiments, metric engines may provide APIs or interfaces that enable calling processes to provide information, such as, visualization identifiers, or the like, that enable the metric engines to lookup or retrieve the source visualization specification.

At block 904, in one or more of the various embodiments, the metric engine may be arranged to provide one or more visualization classifiers. In one or more of the various embodiments, metric engines may be arranged to have access to one or more visualization classifiers. In some embodiments, metric engines may be arranged to maintain a pool of visualization classifiers. In some embodiments, metric engines may be arranged to enable users or organizations to provide one or more visualization classifiers or to define which visualization classifiers should be used. Accordingly, in some embodiments, metric engines may be arranged to determine some or all visualization classifiers based on configuration information to account for local circumstances or local requirements.

At block 906, in one or more of the various embodiments, the metric engine may be arranged to classify the source visualization associated with the source visualization specification based on the source visualization specification and visualization classifiers.

In one or more of the various embodiments, metric engines may be arranged to execute the one or more visualization classifiers against the source visualization specification to classify the source visualization. In one or more of the various embodiments, visualization classifiers may define the criteria for determining if a source visualization matches the classifier. In some embodiments, metric engines may be arranged to execute one or more tests provided or referenced in the visualization classifier. In some embodiments, a visualization classifier may include or reference a grammar that may be used to parse the source visualization specification to identify the features necessary for matching the classifier. For example, visualization classifiers may be looking for particular features such as certain field definitions, data types, row definitions, axis definitions, and so on.

At decision block 908, in one or more of the various embodiments, if metrics in the source visualization may be determinable, control may flow to block 910; otherwise, control may be returned to a calling process. In one or more of the various embodiments, if a source visualization may be classified, it may be assumed to match a visualization classifier that enables the key metrics in the source visualization to be identified.

In one or more of the various embodiments, if a source visualization remains unclassified, it may be unsuitable for providing and surfacing metrics for display in metric visualizations.

At block 910, in one or more of the various embodiments, the metric engine may be arranged to determine one or more metrics based on the classified source visualization. In one or more of the various embodiments, classification may include determining the names, labels, or the like, of the key metrics. In some embodiments, the previous classification step (in block 908) may include determining the metric information at the same time the source visualization is classified.

Next, in one or more of the various embodiments, control may be returned to a calling process.

Figure 10:
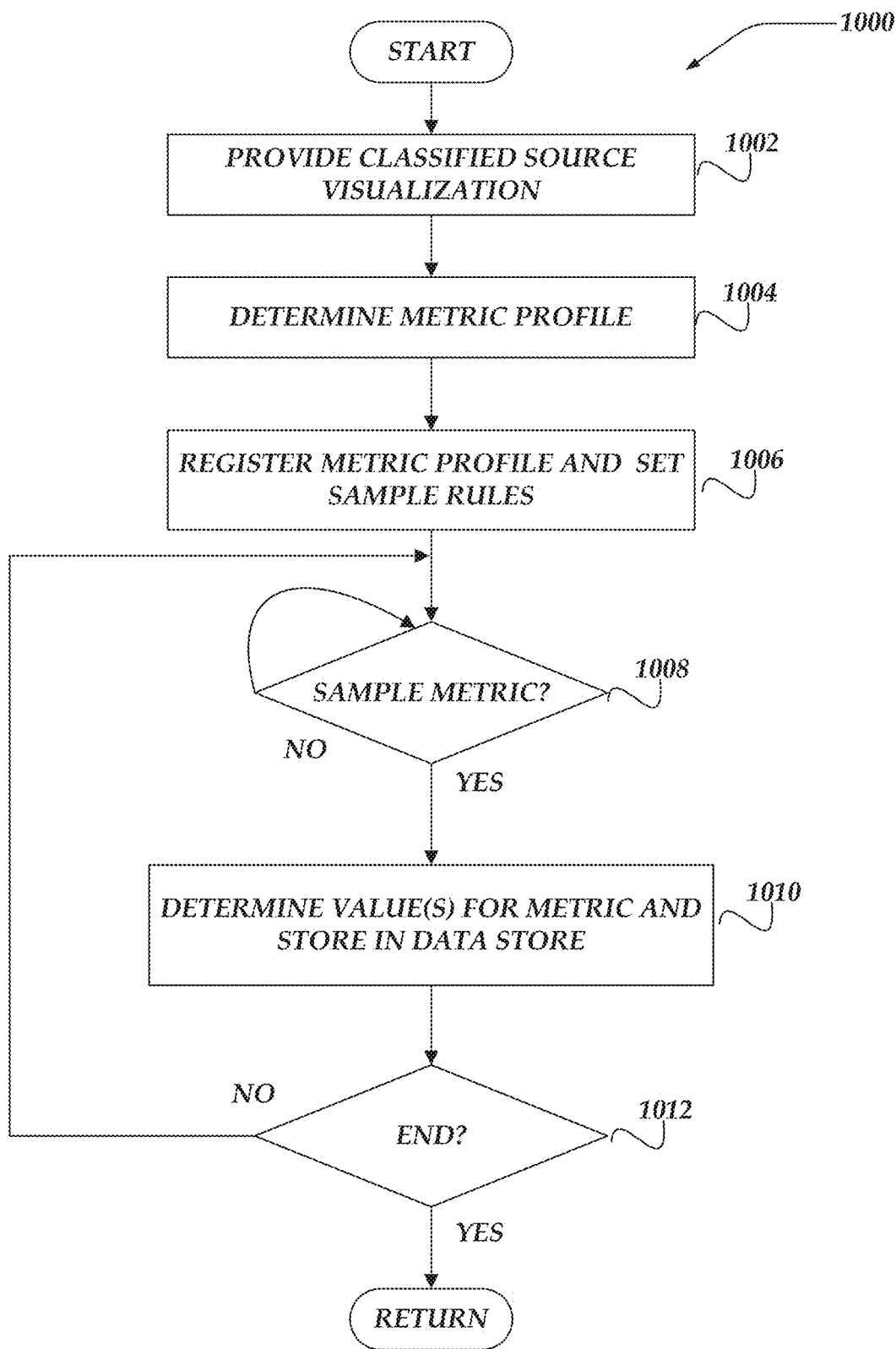
FIG. 10 illustrates a flowchart of a process for providing and surfacing metrics for visualizations in accordance with one or more of the various embodiments.

FIG. 10 illustrates a flowchart of process 1000 for providing and surfacing metrics for visualizations in accordance with one or more of the various embodiments. After a start block, at start block 1002, in one or more of the various embodiments, a metric engine may be arranged to provide a classified source visualization. As described above, a prerequisite for surfacing metrics in visualizations includes the source visualization being classified as being suitable for determining metrics. Accordingly, in some embodiments, if a source visualization has been classified into one or more categories that support metric surfacing, the source visualization or a reference thereto may be provided to a metric engine.

At block 1004, in one or more of the various embodiments, the metric engine may be arranged to determine a metric profile associated with the source visualization. In one or more of the various embodiments, metric engines may be arranged to perform one or more actions to determine the metric information from the source visualization or its source visualization specifications. In one or more of the various embodiments, the particular actions may be determined based on the category or class of the source visualization. In some embodiments, source visualizations may be classified into various classes, such as, single metric, multi-metric, time-based metric, or the like.

In some embodiments, single metric source visualizations may be visualizations that have one metric (e.g., source visualization 502). Likewise, in some embodiments, multi-metric source visualizations may include a single metric broken down in more than category. For example, a single metric source visualization, such as, visualization 502 has a metric for "Cases". While a multi-metric source visualization may also plot values for "Cases" but broken down by city. In some embodiments, metric engines may be arranged to consider multi-metric metrics as one metric that has multiple categories rather than as separate metric.

In one or more of the various embodiments, the available metrics or metric types may be influenced by the definition or syntax of the source visualization specification. Such that, in some embodiments, if the syntax of source visualization specification cannot express a multi-metric visualization, they may not be available for surfacing metrics. In some embodiments, some of the actions for classifying the source visualization may include determining which metrics in the source visualization may be identified or how they may be associated with other metric or sub-metrics.

In one or more of the various embodiments, metric engines may be arranged to employ structure information embedded in the source visualization specification to determine the metrics of interest. Similarly, in some embodiments, the structure information may be employed to determine how to capture or extract the values for the metrics. For example, a source visualization specification may include data binding syntax that maps the marks or plot lines in the source visualization to fields in data model or data source. Accordingly, in one or more of the various embodiments, metric engines may be arranged to employ this information to determine how retrieve the data from the corresponding source visualization model.

In some embodiments, metric engines may be arranged to decode/dereference labels, indirect references, positional indicators, or the like, that may be associated with metric definitions included in source visualization specifications.

Accordingly, in one or more of the various embodiments, metric engines may be arranged to interpret or parse the source visualization specification of a source visualization to determine information for including in the metric profile. Note, in one or more of the various embodiments, metric engines may require rules, code, or instructions specifically tailored to the definition/syntax rules associated with a source visualization specification.

Accordingly, in some embodiments, the same visualization classifier that classified the source visualization may include rules to determine the metric. In some embodiments, the classification of the source visualization may provide some or all of the information for the metric profile.

In one or more of the various embodiments, metric engines may be arranged to provide metric profiles that include (or reference) the information necessary for sampling metric values, including scripts, query expressions, connection strings, credential information, or the like, the specifics of which may be determined based on the source visualization specification or the visualization classifier.

In some embodiments, metric engines may be arranged to include (or reference) metric visualization specifications included in or associated with the metric profile. In some embodiments, metric visualization specifications may include visualization specification information that may be used to determine how to generate metric visualizations that display the metric values.

Accordingly, in one or more of the various embodiments, metric engines may be arranged to employ rules, specifications, parameters, grammars, parsers, or the like, provided via configuration information to account for the differences between the visualization specifications used by different visualization platforms. Likewise, in some embodiments, configuration information may be used to provide user or organization preferences regarding the appearance of metric visualizations, or the like.

Further, in one or more of the various embodiments, metric profiles may also be employed to store sampling rules. In other embodiments, metric profiles may be associated (e.g., registered) with sampling rules. Thus, in some embodiments, several metric profiles may share the same sampling rules without having to individually store or reference them in the metric profile.

At block 1006, in one or more of the various embodiments, the metric engine may be arranged to register the metric profile and set one or more sample rules for the source visualization.

In one or more of the various embodiments, metric engines may be arranged to add the metric profile to a sampling registry (e.g., database, catalog, lookup table, or the like) that indicates that the metric should be sampled as per the associated sampling rules. Accordingly, in one or more of the various embodiments, metric engines may be arranged to query the metric profile registry to determine which metrics to sample at a given time. Alternatively, in some embodiments, the registry may include time-based divisions that may be walked through such that if metric profiles are registered at a visited time division, the metric engine may select those metric profiles for sampling metrics.

At decision block 1008, in one or more of the various embodiments, if metric values should be sampled, control may flow to block 1010; otherwise, control may loop back to decision block 1008. In one or more of the various embodiments, if the metric engine determines that one or more metric profiles may be due for sampling, the metric profiles may be retrieved and processed accordingly. In some cases, if time division sampling (e.g., sampling every ten minutes, or the like) is being used, the time division may not have any metric profiles registered for sampling. Also, in some cases, if conditions required by one or more sampling rules are not satisfied, process 1000 may wait for those conditions to be satisfied before sampling metrics.

At block 1010, in one or more of the various embodiments, the metric engine may be arranged to determine values for the metric and store them in a data store. In one or more of the various embodiments, the metric engine may be arranged to employ information in the metric profile to identify or access the source visualization model associated with the metric.

In some embodiments, metric engines may be arranged to determine the metric values from the source visualization models based on the model profile. In some embodiments, a metric profile may include labels or identifiers that correspond to the marks, plots, or fields in the source visualization model that correspond to the metrics being sampled.

In one or more of the various embodiments, metric engines may be enabled to sample metrics even if the source visualizations they may be associated with are inactive or otherwise not in use. In some embodiments, if a source visualization may be inactive (e.g. not displayed on a hardware display) the visualization engine may perform one or more actions to update the metric value before it is sampled. For example, in some embodiments, if a visualization engine determines that the metric engine is attempting to sample a value from an inactive source visualization, the visualization engine may update the metric value before it is sampled by the metric engine.

Alternatively, in some embodiments, the metric profile may include query expressions, connection strings, credential information, or the like, that enable the metric values to be retrieved directly from the data source.

In some embodiments, a metric may be based on one or more data source fields that may be modified by one or more functions or formulas. Accordingly, in one or more of the various embodiments, metric engines may be arranged to execute the same one or more functions or formulas on the metric values pulled from the data source. In some cases, the formulas or functions may be provided directly to the data source which may execute them before returning the results to the metric engine.

In one or more of the various embodiments, metric engines may be arranged to store the sampled metric values in a metric data store. In some embodiments, the metric data store may be a time-series database that enables the metric values to be associated with specific time bins (or buckets). In other embodiments, the metric engine may store sample time information with the metric values that may be stored in the metric stored rather than requiring a formal/dedicated time-series database.

At decision block 1012, in one or more of the various embodiments, if the sampling may be terminated, control may be returned to a calling process; otherwise, control may loop back to decision block 1008. Generally, in some embodiments, the metric engine may continuously sample metrics based on their registered metric profiles. If sampling is disabled or interrupted, control may be returned to a calling process.

Figure 11:
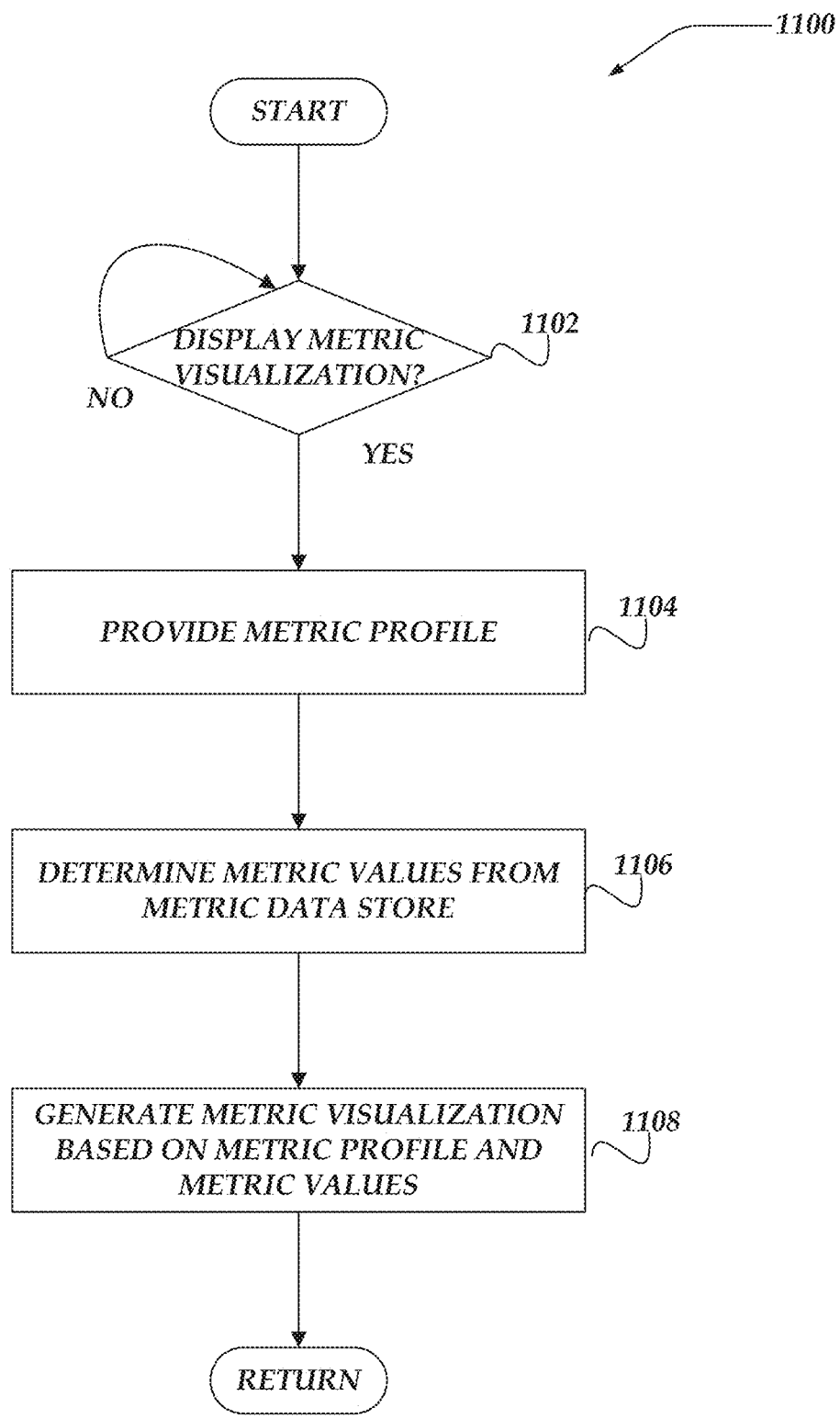
FIG. 11 illustrates a flowchart of a process for displaying metric visualizations for providing and surfacing metrics for visualizations in accordance with one or more of the various embodiments.

FIG. 11 illustrates a flowchart of process 1100 for displaying metric visualizations for providing and surfacing metrics for visualizations in accordance with one or more of the various embodiments. After a start block, at decision block 1102, in one or more of the various embodiments, if a metric visualization may be displayed, control may flow to block 1104; otherwise, control loop back to decision block 1102. In one or more of the various embodiments, visualization platforms may provide one or more user interface controls that enable users to view metric visualizations that may be associated with one or more key metrics. In some embodiments, dashboard authors may include user interface controls that enable users to activate one or more metric visualizations. Likewise, in some embodiments, one or more metric visualizations may be included in a dashboard user interface with one or more other visualizations.

In some embodiments, metric engines may be arranged to automatically activate one or more metric visualizations associated with anomalies, or otherwise meeting one or more defined conditions.

In one or more of the various embodiments, metric engines may be provided a reference or other identifier that may be associated with the metric profile, the originating source visualization, the originating dashboard, or the like.

At block 1104, in one or more of the various embodiments, the metric engine may be arranged to provide a metric profile. In one or more of the various embodiments, metric engines may be arranged to determine the metric profile for the metric visualization. In some embodiments, an identifier or other reference to the metric profile may be provided. Accordingly, in some embodiments, the metric engine may be arranged to retrieve the metric profile from a database, catalog, hash map, lookup table, or the like.

At block 1106, in one or more of the various embodiments, the metric engine may be arranged to determine one or more metric values from the metric data store. In one or more of the various embodiments, the metric engine may be arranged to employ connection information (e.g., connection strings, credentials, ports, network address, API call, query expressions, or the like) included with or associated with the metric profile to access the metric values stored in the metric data store.

In one or more of the various embodiments, the metric profile may include window boundaries to limit the number of values obtained from the metric data store. For example, if the metric values are stored in a time-series database (or otherwise associated with time buckets), the metric engine may be arranged to obtain 'the last 5 days' of metric values, or the like.

At block 1108, in one or more of the various embodiments, the metric engine may be arranged to generate a metric visualization based on the metric profile and the one or more metric values. In one or more of the various embodiments, metric profiles may include or reference a metric visualization specification that may be employed by the visualization engine to render the metric visualization. In some embodiments, the metric visualization may be based on one or more default metric visualization specifications. Alternatively, in some embodiments, users or organizations may be enabled to customize one or more metric visualizations.

Accordingly, in one or more of the various embodiments, metric engines may be arranged to employ the metric profile, the metric values, a metric visualization specification, or the like, to enable a visualization engine to generate or display the metric visualization.

Next, in one or more of the various embodiments, control may be returned to a calling process.

Figure 12:
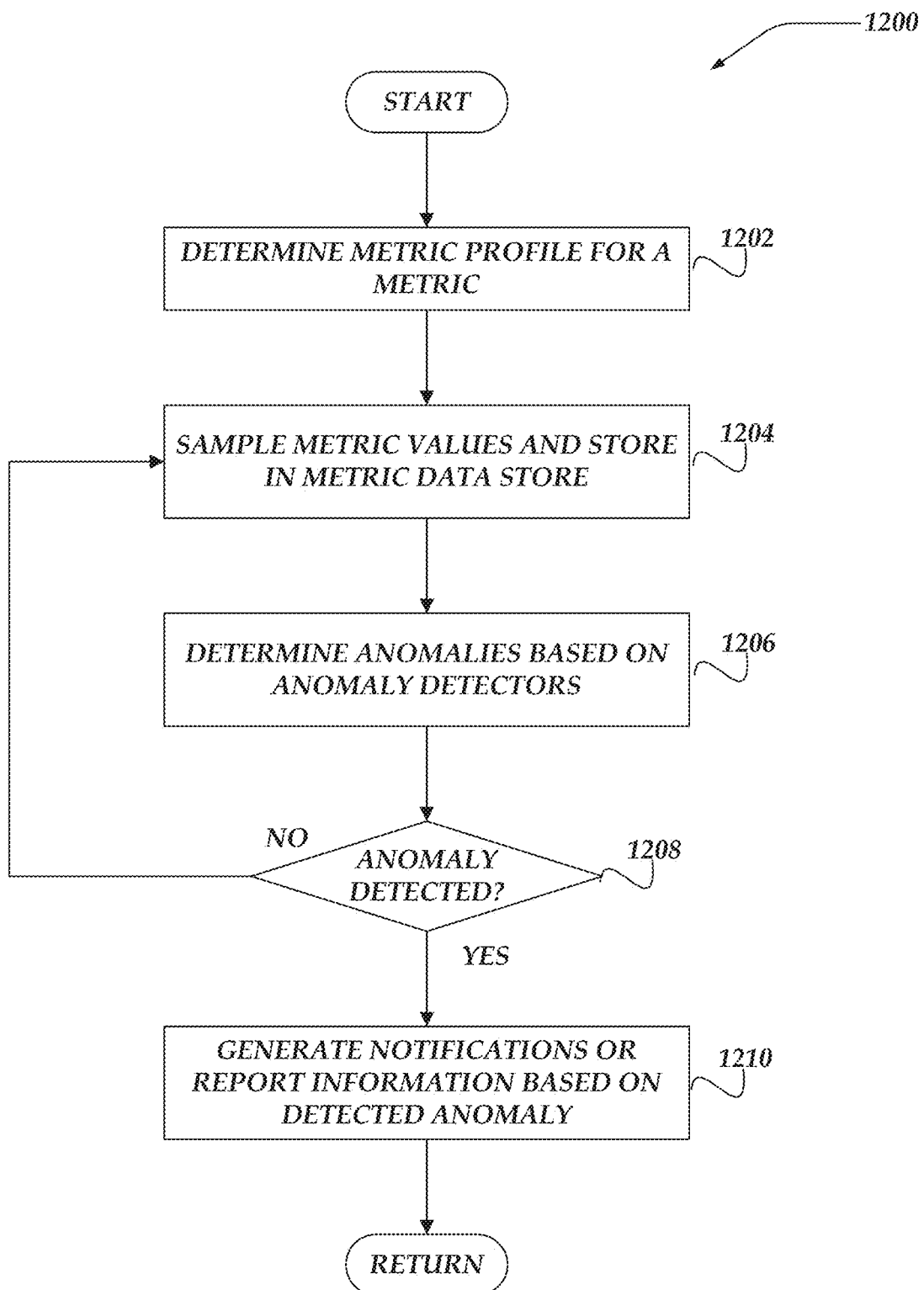
FIG. 12 illustrates a flowchart of a process for monitoring metrics for anomalies as part of providing and surfacing metrics for visualizations in accordance with one or more of the various embodiments.

FIG. 12 illustrates a flowchart of process 1200 for monitoring metrics for anomalies as part of providing and surfacing metrics for visualizations in accordance with one or more of the various embodiments. After a start block, at block 1202, in one or more of the various embodiments, the metric engine may be arranged to determine a metric profile for a metric. In one or more of the various embodiments, metric engines may be arranged to register metrics with metric profiles. In one or more of the various embodiments, the metric profile for a metric may include information, such as, sampling rates, source visualization, or the like. In some embodiments, metric engines may be arranged to associate one or more registered metric profiles with timers, cron jobs, watchdog processes, or the like.

At block 1204, in one or more of the various embodiments, the metric engine may be arranged to sample values for one or more metrics and store them in the metric data store. As described above, metric engines may be arranged to continuously sample metric values and store them in a metric data store. In one or more of the various embodiments, sample rates, collection size (the number of samples to maintain), or the like, may be determined based on the metric profile associated with a metric.

At block 1206, in one or more of the various embodiments, the metric engine may be arranged to employ one or more anomaly detectors to evaluate the metric values to discover one or more anomalies. In one or more of the various embodiments, metric engines may be arranged to determine one or more anomaly detectors that may be employed to identify anomalies in the metric values. In some embodiments, some metrics may be associated with specific preferred anomaly detectors that may be tailored to one or more characteristics of the metric or its associated visualizations.

In one or more of the various embodiments, metric engines may be arranged to run more than one anomaly detector against metric values. Thus, in some embodiments, in some cases, more than one anomaly may be detected at (nearly) the same time. In some embodiments, compound anomaly detectors may be anomaly detectors that include one or more other anomaly detectors.

In one or more of the various embodiments, anomaly detectors may be arranged to apply one or more well-known or conventional statistical operations to determine anomalies, such as, outliers, missing values, or the like. Further, in some embodiments, metric engines may be arranged to employ one or more anomaly detectors that are customized based on user or organization preferences. For example, in some embodiments, a user may have an arbitrarily defined test that checks for particular metric values that may not otherwise appear anomalous using conventional statistical methods.

In one or more of the various embodiments, one or more anomaly detectors may include heuristics that may be tested before or after running more conventional statistical tests.

In one or more of the various embodiments, the simplest anomaly detection schemes may look for larger-than "normal" changes, computing day-to-day differences and looking for one that was statistically anomalous, e.g. several standard deviations from the mean difference. In some embodiments, anomaly detectors may be arranged to employ more complex schemes that may fit analytical models to the metric values and then flag an anomaly if the predicted and actual metric values deviate beyond an acceptable threshold amount.

In one or more of the various embodiments, one or more anomaly detectors may be arranged to generate an intensity score, or the like, that relates to the importance or criticality of a given anomalous. Likewise, in some embodiments, anomaly detectors may be arranged to provide a confidence score, or the like, that relates to the certainty or 'closeness of match' for detected anomalies.

Accordingly, in some embodiments, metric engines may be arranged to enable users or organizations to set notification rules or filters based on the intensity scores, confidence scores, or the like.

At decision block 1208, in one or more of the various embodiments, if an anomaly may be detected, control may flow to block 1210; otherwise, control may loop back to block 1204. In some embodiments, if one or more anomalies may be detected by one or more anomaly detectors, the metric engine may be arranged to compare one or more of the anomaly types, the affected metrics, the intensity scores, the confidence scores, or the like, against one or more notification rules to determine if the detected anomaly should be ignored or discarded. In some embodiments, such notification rules may be associated with users, organizations, metrics or metric profiles, dashboards, visualizations, or the like.

At block 1210, in one or more of the various embodiments, the metric engine may be arranged to generate one or more notifications or report information based on the detected anomaly. In one or more of the various embodiments, absent a rule that disregards or suppresses the anomaly, the metric engine may be arranged to determine one or more notification methods or one or more notification targets. In one or more of the various embodiments, metric engine may be arranged to employ rules or instructions provided via configuration information to determine notification methods or notification targets. In some embodiments, the metric engine may generate one or more event messages associated with the anomaly and provide them to third party monitoring services that may route the notification to responsible parties or track its resolution, if any.

In one or more of the various embodiments, notifications may include sending text messages, emails, other messages via other messaging applications, audio alerts, or the like. In some embodiments, metric engines may be arranged to register the notification with the visualization engine such that alert information associated with the anomaly may be displayed on a user interface. In some cases, for some embodiments, a visual alert may be displayed on the dashboard user interface that includes the source visualization or the metric visualization associated with the anomaly. In some embodiments, the notification may include generating a log entry that may be reviewed later.

In one or more of the various embodiments, the contents of the notification may vary depending on the type of anomaly, the metric, the source visualization, the dashboard, or the like. Accordingly, in some embodiments, metric engines may be arranged to determine notification rules or notification formats based on configuration information to account for local circumstances or local requirements.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for generating metrics based on visualizations using one or more processors that execute instructions to perform actions, comprising:
    providing a dashboard that is associated with one or more source visualizations that each display a current value of one or more metrics from one or more source visualization models, wherein each source visualization corresponds to a specification and a source visualization model;
    evaluating each specification to determine one or more characteristics of each source visualization, wherein the one or more source visualizations are classified based on one or more classifiers and the one or more characteristics;
    determining the one or more metrics for each classified source visualization based on the one or more classifiers;
    generating one or more metric profiles that correspond to the one or more metrics based on the one or more classifiers;
    sampling the one or more source visualization models to provide one or more values of the one or more metrics, wherein a sampling rate is based on the one or more metric profiles;
    storing the one or more sampled values with one or more time values in a metric data store, wherein the one or more time values correspond to when the one or more values were sampled; and
    generating one or more metric visualizations based on the one or more values and the one or more time values, wherein the one or more metric visualizations display one or more previously sampled values of the one or more metrics.

2. The method of claim 1, wherein evaluating each specification, further includes:
    iterating through the one or more classifiers to determine a class of visualizations that corresponds to the one or more source visualizations;
    executing one or more actions to determine the one or more characteristics of each source visualization based on its corresponding class; and
    excluding each of the one or more source visualizations that remains unclassified.

3. The method of claim 1, wherein displaying the one or more metric visualizations, further comprises, displaying the one or more metric visualizations in the dashboard or in another user interface.

4. The method of claim 1, wherein determining the one or more metrics, further comprises, determining one or more of one or more single values metrics or one or more multiple valued metrics, wherein each of the one or more multiple valued metrics are single metrics that are divided into two or more categories.

5. The method of claim 1, further comprising:
    providing one or more anomaly detectors that are arranged to identify one or more statistical anomalies that are present in the one or more values of the one or more metrics; and
    in response to determining one or more statistical anomalies based on the one or more anomaly detectors, performing further actions, including:
        providing one or more alerts that include one or more of one or more notifications, one or more alerts, or one or more reports; and
        communicating the one or more alerts to one or more of one or more responsible parties or one or more services.

6. The method of claim 1, wherein sampling the one or more source visualization models to provide the one or more values of the one or more metrics, further comprises, sampling the one or more source visualization models while the dashboard or the one or more source visualizations are inactive, wherein the inactive dashboard or the one or more inactive source visualizations are omitted from being displayed.

7. A network computer for generating metrics based on visualizations, comprising:
    a memory that stores at least instructions; and
    one or more processors that execute instructions that perform actions, including:
        providing a dashboard that is associated with one or more source visualizations that each display a current value of one or more metrics from one or more source visualization models, wherein each source visualization corresponds to a specification and a source visualization model;
        evaluating each specification to determine one or more characteristics of each source visualization, wherein the one or more source visualizations are classified based on one or more classifiers and the one or more characteristics;
        determining the one or more metrics for each classified source visualization based on the one or more classifiers;
        generating one or more metric profiles that correspond to the one or more metrics based on the one or more classifiers;
        sampling the one or more source visualization models to provide one or more values of the one or more metrics, wherein a sampling rate is based on the one or more metric profiles;
        storing the one or more sampled values with one or more time values in a metric data store, wherein the one or more time values correspond to when the one or more values were sampled; and
        generating one or more metric visualizations based on the one or more values and the one or more time values, wherein the one or more metric visualizations display one or more previously sampled values of the one or more metrics.

8. The network computer of claim 7, wherein evaluating each specification, further includes:
    iterating through the one or more classifiers to determine a class of visualizations that corresponds to the one or more source visualizations;
    executing one or more actions to determine the one or more characteristics of each source visualization based on its corresponding class; and
    excluding each of the one or more source visualizations that remains unclassified.

9. The network computer of claim 7, wherein displaying the one or more metric visualizations, further comprises, displaying the one or more metric visualizations in the dashboard or in another user interface.

10. The network computer of claim 7, wherein determining the one or more metrics, further comprises, determining one or more of one or more single values metrics or one or more multiple valued metrics, wherein each of the one or more multiple valued metrics are single metrics that are divided into two or more categories.

11. The network computer of claim 7, wherein the one or more processors execute instructions that perform actions, further comprising:
providing one or more anomaly detectors that are arranged to identify one or more statistical anomalies that are present in the one or more values of the one or more metrics; and
in response to determining one or more statistical anomalies based on the one or more anomaly detectors, performing further actions, including:
providing one or more alerts that include one or more of one or more notifications, one or more alerts, or one or more reports; and
communicating the one or more alerts to one or more of one or more responsible parties or one or more services.

12. The network computer of claim 7, wherein sampling the one or more source visualization models to provide the one or more values of the one or more metrics, further comprises, sampling the one or more source visualization models while the dashboard or the one or more source visualizations are inactive, wherein the inactive dashboard or the one or more inactive source visualizations are omitted from being displayed.

13. A system for generating metrics based on visualizations over a network, comprising:
a network computer, comprising:
a memory that stores at least instructions; and
one or more processors that execute instructions that perform actions, including:
providing a dashboard that is associated with one or more source visualizations that each display a current value of one or more metrics from one or more source visualization models, wherein each source visualization corresponds to a specification and a source visualization model;
evaluating each specification to determine one or more characteristics of each source visualization, wherein the one or more source visualizations are classified based on one or more classifiers and the one or more characteristics;
determining the one or more metrics for each classified source visualization based on the one or more classifiers;
generating one or more metric profiles that correspond to the one or more metrics based on the one or more classifiers;
sampling the one or more source visualization models to provide one or more values of the one or more metrics, wherein a sampling rate is based on the one or more metric profiles;
storing the one or more sampled values with one or more time values in a metric data store, wherein the one or more time values correspond to when the one or more values were sampled; and
generating one or more metric visualizations based on the one or more values and the one or more time values, wherein the one or more metric visualizations display one or more previously sampled values of the one or more metrics; and
a client computer, comprising:
a memory that stores at least instructions; and
one or more processors that execute instructions that perform actions, including:
displaying the dashboard and the one or more source visualizations.

14. The system of claim 13, wherein evaluating each specification, further includes:
iterating through the one or more classifiers to determine a class of visualizations that corresponds to the one or more source visualizations;
executing one or more actions to determine the one or more characteristics of each source visualization based on its corresponding class; and
excluding each of the one or more source visualizations that remains unclassified.

15. The system of claim 13, wherein displaying the one or more metric visualizations, further comprises, displaying the one or more metric visualizations in the dashboard or in another user interface.

16. The system of claim 13, wherein determining the one or more metrics, further comprises, determining one or more of one or more single values metrics or one or more multiple valued metrics, wherein each of the one or more multiple valued metrics are single metrics that are divided into two or more categories.

17. The system of claim 13, wherein the one or more processors of the network computer execute instructions that perform actions, further comprising:
providing one or more anomaly detectors that are arranged to identify one or more statistical anomalies that are present in the one or more values of the one or more metrics; and
in response to determining one or more statistical anomalies based on the one or more anomaly detectors, performing further actions, including:
providing one or more alerts that include one or more of one or more notifications, one or more alerts, or one or more reports; and
communicating the one or more alerts to one or more of one or more responsible parties or one or more services.

18. The system of claim 13, wherein sampling the one or more source visualization models to provide the one or more values of the one or more metrics, further comprises, sampling the one or more source visualization models while the dashboard or the one or more source visualizations are inactive, wherein the inactive dashboard or the one or more inactive source visualizations are omitted from being displayed.

19. A computer readable non-transitory storage media for storing instructions, wherein execution of the instructions by one or more processors enables performance of actions for generating metrics based on visualizations, comprising:
providing a dashboard that is associated with one or more source visualizations that each display a current value of one or more metrics from one or more source visualization models, wherein each source visualization corresponds to a specification and a source visualization model;
evaluating each specification to determine one or more characteristics of each source visualization, wherein the one or more source visualizations are classified based on one or more classifiers and the one or more characteristics;
determining the one or more metrics for each classified source visualization based on the one or more classifiers;

generating one or more metric profiles that correspond to the one or more metrics based on the one or more classifiers;
sampling the one or more source visualization models to provide one or more values of the one or more metrics, wherein a sampling rate is based on the one or more metric profiles;
storing the one or more sampled values with one or more time values in a metric data store, wherein the one or more time values correspond to when the one or more values were sampled; and
generating one or more metric visualizations based on the one or more values and the one or more time values, wherein the one or more metric visualizations display one or more previously sampled values of the one or more metrics.

20. The computer readable non-transitory storage media of claim 19, wherein evaluating each specification, further includes:
iterating through the one or more classifiers to determine a class of visualizations that corresponds to the one or more source visualizations;
executing one or more actions to determine the one or more characteristics of each source visualization based on its corresponding class; and
excluding each of the one or more source visualizations that remains unclassified.

21. The computer readable non-transitory storage media of claim 19, wherein displaying the one or more metric visualizations, further comprises, displaying the one or more metric visualizations in the dashboard or in another user interface.

22. The computer readable non-transitory storage media of claim 19, wherein determining the one or more metrics, further comprises, determining one or more of one or more single values metrics or one or more multiple valued metrics, wherein each of the one or more multiple valued metrics are single metrics that are divided into two or more categories.

23. The computer readable non-transitory storage media of claim 19, wherein the one or more processors execute instructions that perform actions, further comprising:
providing one or more anomaly detectors that are arranged to identify one or more statistical anomalies that are present in the one or more values of the one or more metrics; and
in response to determining one or more statistical anomalies based on the one or more anomaly detectors, performing further actions, including:
providing one or more alerts that include one or more of one or more notifications, one or more alerts, or one or more reports; and
communicating the one or more alerts to one or more of one or more responsible parties or one or more services.

24. The computer readable non-transitory storage media of claim 19, wherein sampling the one or more source visualization models to provide the one or more values of the one or more metrics, further comprises, sampling the one or more source visualization models while the dashboard or the one or more source visualizations are inactive, wherein the inactive dashboard or the one or more inactive source visualizations are omitted from being displayed.

* * * * *